ized part of the first and second series of cipher pulses to decipher the transmitted message.

United States Patent [19]
Ehrat

[11] 4,145,569
[45] Mar. 20, 1979

[54] METHOD AND APPARATUS FOR SYNCHRONIZING THE CIPHERING AND DECIPHERING OF BINARY-CODED MESSAGES

[75] Inventor: Kurt Ehrat, Zurich, Switzerland

[73] Assignee: Gretag Aktiengesellschaft, Regensdorf, Switzerland

[21] Appl. No.: 420,393

[22] Filed: Dec. 22, 1964

[51] Int. Cl.² .............................................. H04L 9/02
[52] U.S. Cl. ..................................... 178/22; 178/69.1; 364/728
[58] Field of Search ............................ 178/22; 35/2, 4

[56] References Cited

U.S. PATENT DOCUMENTS

| 3,051,783 | 8/1962 | Hell et al. ............................... 178/22 |
| 3,229,037 | 1/1966 | Sturzinger et al. ...................... 178/22 |

*Primary Examiner*—Howard A. Birmiel
*Attorney, Agent, or Firm*—Burns, Doane, Swecker & Mathis

EXEMPLARY CLAIM

1. A method of ciphering and deciphering binary coded messages represented by coded series of pulses comprising setting a first pulse generator to an initial condition as defined by a secret basic code and then generating under control of a first clock a first binary coded series of cipher pulses, transmitting a part of the first series of cipher pulses to a receiving station, generating at the receiving station under control of a second clock a second binary coded series of cipher pulses having a distribution identical with the first series of cipher pulses, changing at the receiving station the part of the first and a corresponding part of the second series of cipher pulses in their relative positions and forming for each of said positions over an interval of several pulses one correlation factor by multiplying together the values of the momentarily opposite simultaneous pulses of the corresponding parts of the first and second series of cipher pulses and summation of the results of said multiplications, step synchronizing with this series of correlation factors a further part of the second series of cipher pulses with a corresponding part of the first series of cipher pulses, taking advantage of the criterion that the step synchronism of the parts of the first and second series of cipher pulses gives an optimal value of the correlation factor, generating at the transmitting station clear message pulses representing a message to be transmitted, mixing the clear message pulses with a step synchronized part of the first series of cipher pulses to form an enciphered pulse train, transmitting the enciphered pulse train to the receiving station and mixing at the receiving station the enciphered pulse train with the corresponding step synchronized part of the second series of cipher pulses taking into account any phase deviation between the corresponding step synchronized parts of the first and second series of cipher pulses to decipher the transmitted message.

27 Claims, 24 Drawing Figures

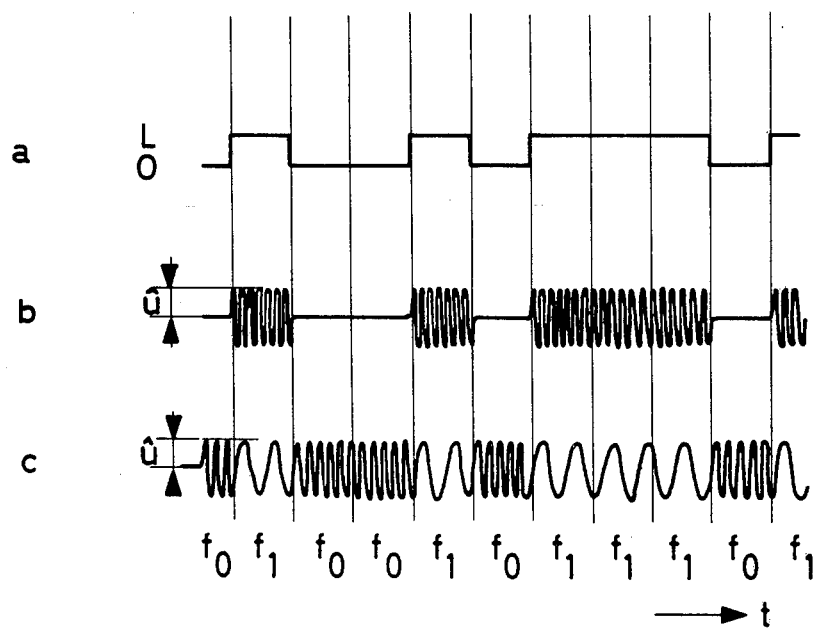
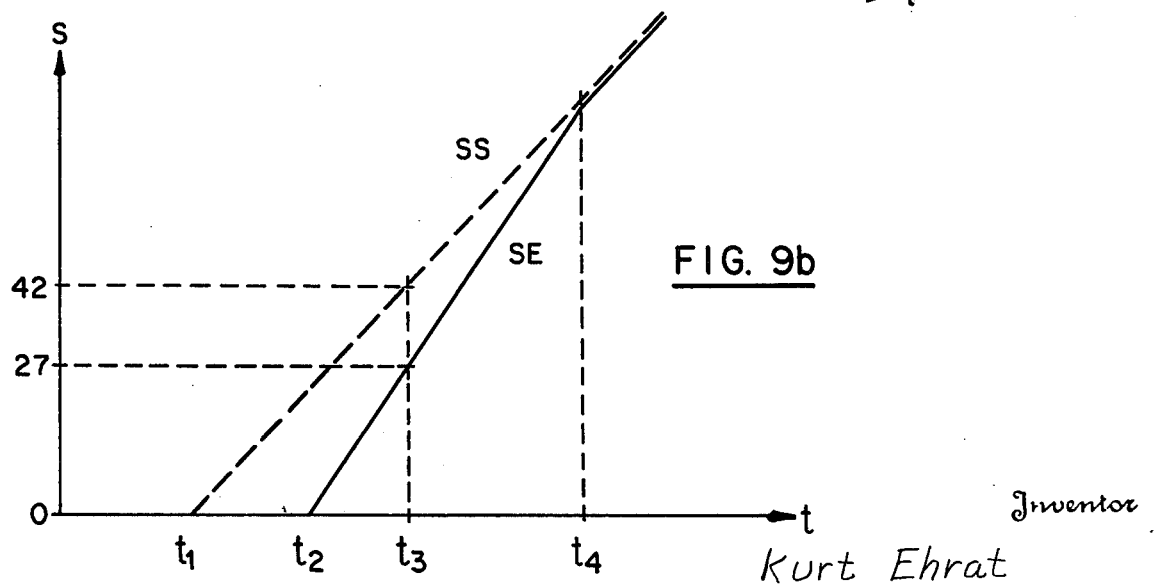

Inventor

Kurt Ehrat

By Pierce, Schiffler & Parker
Attorneys

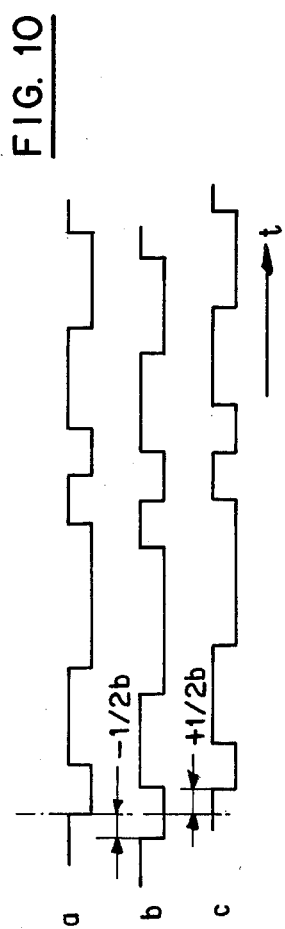
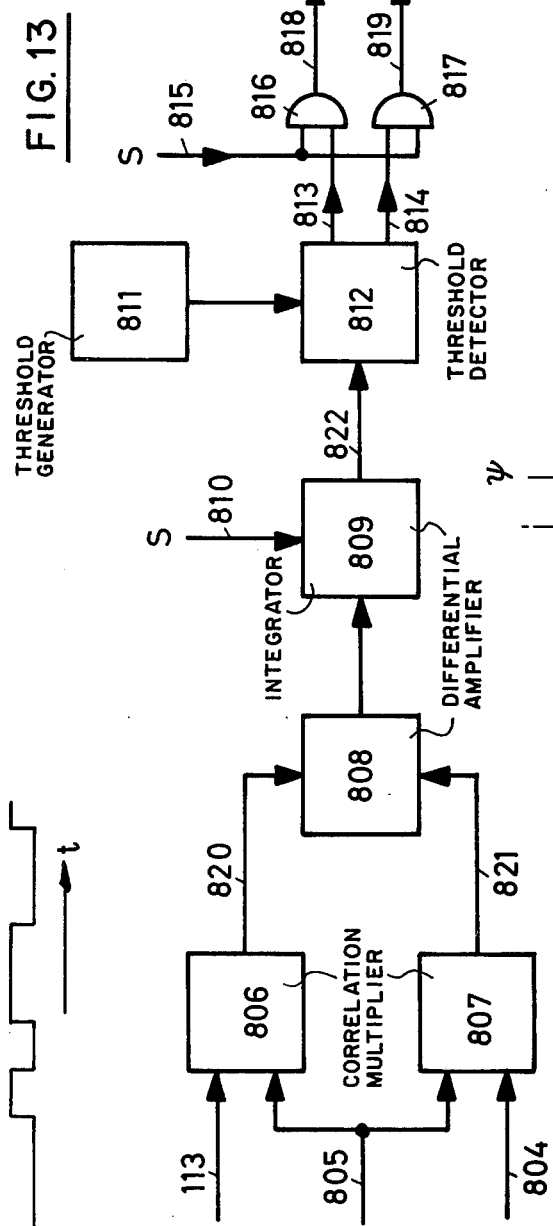
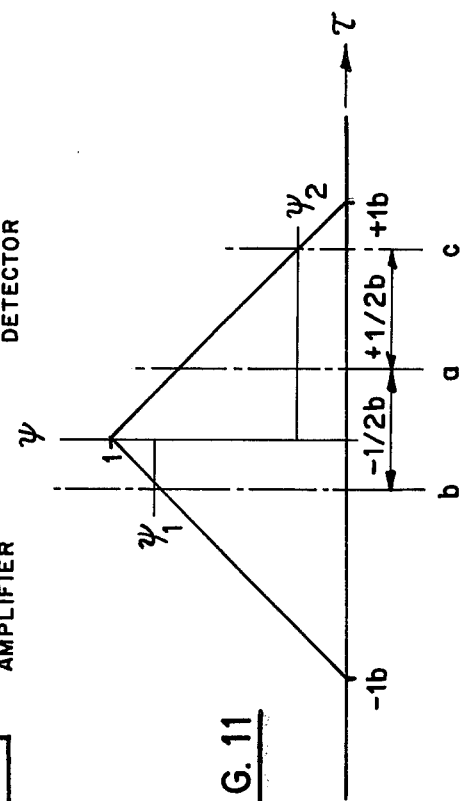

METHOD AND APPARATUS FOR SYNCHRONIZING THE CIPHERING AND DECIPHERING OF BINARY-CODED MESSAGES

The invention relates to a method and apparatus for synchronizing the ciphering and deciphering of binary-coded messages.

In one method of ciphering and deciphering messages the clear pulses of the message are mixed with cipher pulses, transmitted with the aid of a suitable type of modulation, and recovered at the reception and by mixing with identical cipher pulses. These cipher pulse sequences are produced at the transmission and reception ends in accordance with identical rules by means of respective cipher pulse generators having a "pseudorandom" character and the cipher pulse sequences are determined by the initial conditions of the cipher pulse generators. The initial conditions are produced by the use of at least one secret basic key and preferably at least one additional key, while the ciphering and deciphering of the messages in pulse form and also the operation of the cipher pulse generators at the transmission and reception ends are each controlled by a clock.

Installations working by this method consist on the transmission side of a clear information-clear pulse converter, a cipher pulse generator, and a ciphering mixer.

The clear information-clear pulse converter converts the incoming information into a binary-coded clear impulse. This clear impulse sequences is passed to the ciphering mixer, which at the same time is fed by the cipher pulse generator with a cipher pulse sequence in binary form. In the ciphering mixer the clear pulses are ciphered with the cipher pulses, this being preferably effected by "modulo-two-addition". The resulting ciphered pulse sequence (mixture of the clear pulse sequence with the cipher pulse sequence) is transmitted to the information receiver (reception end) with the aid of a suitable type of modulation.

The clear information may for example be an (analogue) speech signal in the case of telephony transmission. The speech signal is then periodically sampled in known manner and converted in an analogue-digital converter into a sequence of (digital) binary pulses, as is customary in known pulse-code modulation. The clear information-clear pulse converter here consists of the sampling device and the analogue-digital converter.

In another example, teleprinter transmission, the clear information consists of the letters and figures entering the teleprinter. These are converted in the teleprinter itself into binary pulses of normally five bits (information) per letter, while start and stop pulses are also normally added for the transmission. These binary pulses can be converted in a code converter into a code which is more favourable for ciphering and transmission, while the start and stop pulses may be suppressed. In this case the clear information-clear pulse converter consists of teleprinter and code converter.

On the reception side similar devices are required, but these work partly in the reverse manner. These are: demodulator, deciphering mixer, cipher pulse generator, and clear pulse-clear information converter.

The demodulated ciphered pulse sequence received and also the cipher pulse sequence of the cipher pulse generator on the reception side are fed to the deciphering mixer, which from these two pulse sequences recovers the clear pulse sequence. Identical cipher pulses must naturally be used for ciphering and deciphering, that is to say the cipher pulse generator at the reception and transmission ends must work in synchronism. The clear pulse sequence produced by the deciphering mixer is converted back into the original information form by the clear pulse-clear information converter.

The cipher pulse generators used in such methods are devices of identical construction and of a mechanical, electromechanical, and/or electronic nature. They contain a large number of cipher forming elements which are variable in condition and in reciprocal allocation, for example cam discs, permutation switches, and/or electronic elements, and so on. The cipher pulse sequence is accordingly dependent on the construction and co-operation of the individual elements as well as on the position of these elements at the beginning of the transmission of the message. This so-called initial condition must be adjusted at transmitter and receiver before the commencement of transmission, whereupon with synchronous start and operation the cipher pulse generators at the transmission and reception ends supply identical cipher pulse sequences. The cipher pulse sequences have a "pseudo-random" character, that is to say similar statistical distribution of the cipher pulses like real random sequences, but produced mechanically and in a predetermined manner.

In the normal way the starting conditions of the cipher pulse generators are determined by a secret basic key and also by a (non-secret) additional key which for example varies from transmission to transmission and which for example is transmitted unciphered before each transmission. It is, however, also possible to manage without an additional key, that is to say with a secret basic key alone, provided that this is varied sufficiently frequently.

Suitable key pulse generators are for example described in detail in British Patent specifications Nos. 951,174 and 973,536. As already mentioned, in the above described methods exact synchronism of the cipher pulse generators on the transmission and reception sides are necessary, that is to say on the transmission and reception sides of the same cipher pulses must be passed simultaneously to the ciphering mixer and deciphering mixer. To be precise, the cipher pulse generator at the reception end must lag by the running time of the signal (ciphered message pulses) from the ciphering mixer on the transmission side to the deciphering mixer on the reception side. This lag however is obtained automatically, since the signals which are used to obtain the code synchronism of the code pulse generators likewise have this running time.

Methods or apparatus previously proposed for the transmission of ciphered messages use additional synchronizing pulses, independent of the contents of the information transmitted, for the purpose of maintaining synchronism between the cipher pulse generators on the transmission and reception sides.

In one of these methods, the so-called start-stop system, start impulses are used for synchronization (as so-called synchronizing pulses). The clear information follows each start pulse in each case in the form of a larger or smaller number of information pulses (information bits). The time interval between the last information bit and the next start pulse is known as the stop pulse. This method is for example applied in known teleprinter transmission. For ciphered transmission, these start pulses can be used for the synchronization of the cipher pulse generators.

The cipher pulse generator on the transmission and reception sides must then give after each start pulse a number of cipher pulses, corresponding to the number of bits of the clear pulse combination (code pulse combination), by which the clear pulses are ciphered. Start and stop pulses are transmitted without encoding.

It is assumed that before the commencement of the transmission of the message the cipher pulse generators on the transmission and reception sides have been brought into the same starting condition. Thus on the transmission and reception sides, after each start pulse the two cipher pulse generators will each produce an identical cipher pulse combination, which is used for ciphering and deciphering respectively. Similarly, the cipher pulse generators on the transmission and reception sides are advanced one or more steps by each start pulse.

This process has a number of disadvantages for example disturbances or fading occurring on the transmission path may actuate and advance the cipher pulse generator on the reception side at the wrong moment or prevent synchronous actuation and advance. In such a case the cipher pulse combinations used for ciphering and deciphering are no longer identical, and thus without correction of the conditions of the cipher pulse generators on the transmission or reception side, deciphering of the transmitted message will be impossible. Another disadvantage is that the position of the start and stop pulses and thus naturally also the position of the information pulses can be determined relatively simply by unauthorised persons. Unauthorised persons will thus find that the deciphering of the secret message will be facilitated on the one hand, while on the other hand by the introduction of start pulses on the transmission path they will be able to disturb the synchronism of the cipher pulse generators on the transmission and reception sides and thus make ciphered transmission impossible.

According to another proposal, the so-called synchronous system, the transmitter and receiver are each equipped with a clock of as far as possible the same frequency whereby the operation (advance) of the cipher pulse generators and also ciphering and deciphering are controlled. At the commencement of the transmission, the cipher pulse generators on the transmission and reception sides are first brought into the same starting condition. Thereupon during an introductory phase the synchronization of the clock on the reception side to that on the tranmission side is effected, with the simultaneous switching on of the cipher pulse generators on the reception and transmission sides, so that both give identical cipher pulse sequences. During the transmission the clocks continuously advance the cipher pulse generators, while the identical cipher pulse sequences on the transmission and reception sides are used for ciphering and deciphering the clear pulse combination. The clear pulse combinations must be fed into the ciphering mixer or deciphering mixer in the same rhythm as the cipher pulse combinations. In teleprinter operation for example the frequency of the clock may be so selected that between two timing pulses (synchronization pulses) following one another the combination of five information bits (clear information) of a letter is transmitted. It is clear that in this case the clock frequency must be at least as great as the most rapid letter sequence of the teleprinter. In addition, this generally requires a buffer synchronous storage means, which precedes the ciphering mixer on the transmission side and feeds the clear pulse combination to the ciphering mixer with the correct phase position. For the purpose of maintaining synchronism during the transmission, use is made of the synchronizing pulses transmitted without ciphering. For this purpose the phase position of the synchronizing pulses transmitted are compared in the receiver in a circuit arrangement which is as insensitive as possible to disturbance with those of the clock on the receiver side and any difference in phase is compensated. In this way code synchronism between the cipher pulse generators on the transmission and reception sides is insured for a certain time in the event of disturbances or interruption of the transmission line, but this method also has in certain applications the disadvantage that unauthorised persons can without difficulty intervene in the pulse synchronism or by introducing synchronizing pulses of a frequency differing slightly from the synchronizing pulses transmitted can shift the clock which is correctly synchronized on the receiver side from its originally correct phase position, so that deciphering can be made impossible. In addition, the recogniability of the periodically transmitted synchronizing pulses facilitates the determination of the position of the information pulses lying therebetween.

It is an object, therefore, of the present invention to provide an improved method of ciphering and deciphering messages.

Accordingly there is provided a method of ciphering and deciphering binary-coded messages comprising setting a first pulse generator to an initial condition as defined by a secret basic code and then generating a first series of cipher pulses under control of a first clock, transmitting said first series of cipher pulses to a receiving station, generating at the receiving station a second series of cipher pulses having a distribution identical to the first series of cipher pulses under control of a second clock, forming at the receiving station at least one correlation factor over an interval between at least one part of the first series of cipher pulses and at least one part of the second series of cipher pulses and controlling with the correlation factor the generation of the second series of cipher pulses in accordance with the first series of cipher pulses and the synchronization of the second clock with the first clock, generating at the transmitting station binary-coded clear message pulses representing a message to be transmitted, mixing the clear message pulses with the first series of cipher pulses to form an enciphered pulse train, transmitting the enciphered pulse train to the receiving station and mixing at the receiving station the enciphered pulse train with the synchronized second series of cipher pulses to decipher the transmitted message.

There is further provided apparatus for ciphering and deciphering binary-coded messages comprising a first clock, a first pulse generator settable to an initial condition as defined by a secret basic code to thereafter generate a first series of cipher pulses under control of said first clock, means for generating binary-coded clear message pulses representing a message to be transmitted, a first mixer for mixing the clear message pulses with the first series of cipher pulses to form an enciphered pulse train, a transmitter for transmitting said enciphered pulse train, a receiver for receiving said enciphered pulse train, a second clock, means for generating a second series of cipher pulses having a distribution identical to the first series of cipher pulses under control of said second clock, a second mixer for mixing the enciphered pulse train received by said receiver with the second series of cipher pulses to decipher the received message, means for forming a correlation factor between at least one part, acting as a first correlation interval, of the first series of cipher pulses and at least one part, acting as a second correlation interval, of the second series of cipher pulses and means for controlling the generation of the second series of cipher pulses in accordance with the first series of cipher pulses, and the synchronization of the second clock with the first clock with said correlation factor.

The correlation properties, known per se, of random sequences are used for synchronizing the ciphering and deciphering. This is explained in detail below. The main advantage of the method according to the invention is that the synchronization is effected direct with the cipher pulse sequences having a pseudo-random character and not by means of special periodic synchronizing pulses. This ensures perfect recognition of friend and foe. In particular, it is not possible for unauthorised persons to disturb the obtaining of code synchronism or, after this synchronism has been obtained, to shift the receiver from the correct phase position. In addition, by avoiding the use of special synchronizing pulses transmitted without being ciphered and avoiding the consequent recognisability of connected clear pulse accommodations, the security of the cipher is increased.

In addition, the position of the cipher pulse generators after they have been switched on synchronously can be varied in dependence on the secret basic key and/or at least one additional key.

For each key adjustment it is necessary to obtain a new initial condition. For this purpose use is preferably made of the methods described in British Patent specification No. 951,174 and No. 1,062,130. In these methods the initial condition of the cipher pulse generators is obtained in dependence on the secret basic key and/or at least one additional key.

According to the first above-mentioned Specification, this additional key is obtained by means of a random generator (noise generator or the like) and transmitted from the transmitter to the receiver. According to the second above-mentioned Specification, the transmission of the additional key can be avoided by deriving it from the date and time of day in accordance with identical rules at the transmission and reception ends.

After the step synchronization has been effected, there may still be a step phase deviation between the cipher pulse sequence arriving from the transmitter and that produced at the reception side, but this is smaller than a bit period.

According to a further feature of the invention, after the step synchronization, for the purpose of step phase correction or for the maintenance of the step phase synchronism between transmitter and receiver, there is formed at least one correlation function value between the time functions of at least one part of the cipher pulse sequence of the or other cipher pulse sequences on the reception side reception side, which are produced by phase displacement, and at least one part of the transmission side cipher pulse sequence transmitted, or other transmission side cipher pulse sequences produced by phase displacement of the reception side, and the phase is re-adjusted on the basis of this correlation function value. For the purpose of determining the direction of the step phase deviation of the timing of the reception side clock in relation to the timing of the transmission side clock, more than one correlation function value is preferably formed on the reception side between the transmission and reception side cipher pulse sequences which have different relative phase positions in respect of one another.

A method according to a preferred embodiment of the invention and an installation working in accordance with this method are explained more fully below with reference to the accompanying drawings, in which:

FIG. 2 shows diagrams of two types of modulation waveforms (b,c) for transmission of a ciphered message pulse sequence (a);

FIGS. 9a and 9b show time plans for two possibilities of commencing step synchornism;

FIGS. 10 to 12 show graphs illustrating automatic step synchronization;

FIG. 13 shows an apparatus for effecting step synchronization;

Figure 1:
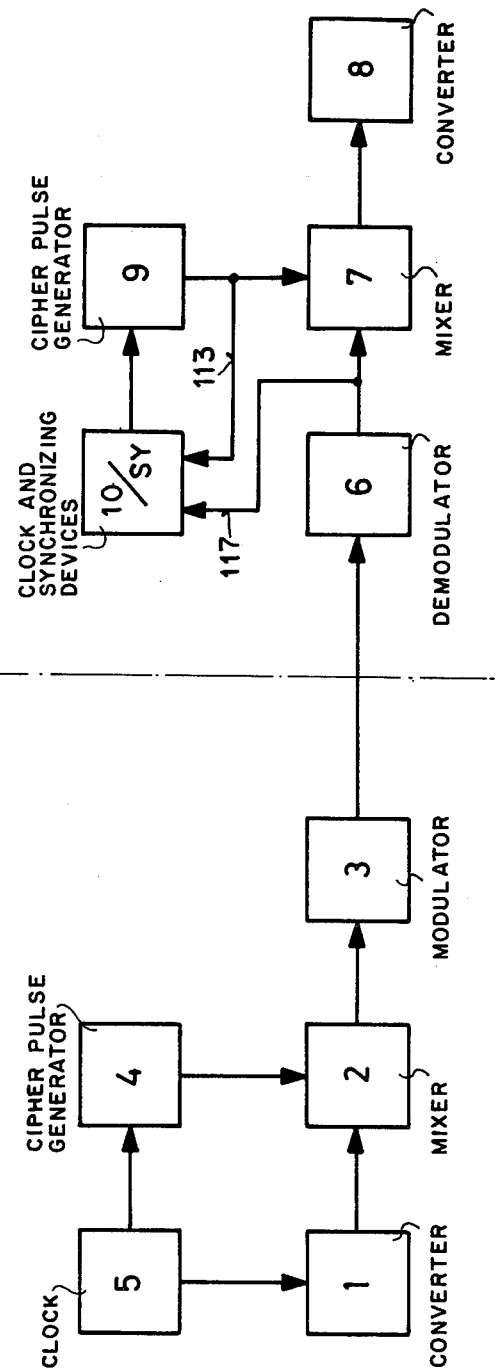
FIG. 1 shows in block diagrammatic form the fundamental construction of an installation working in accordance with a method according to a preferred embodiment of the present invention.

With the aid of the block diagram in FIG. 1, the co-operation of the various parts of an installation for enciphered transmission of messages by "synchronous operation" with correlation synchronization will first be explained. Such installations are used for the enciphered transmission of binary-coded information, for example data, speech impulse-code modulation, and teleprinter signals.

The clear information to be transmitted is fed from a clear information-clear pulse converter 1 to an enciphering mixer 2 in the form of a binary-coded clear pulse sequence. At the same time the enciphering mixer 2 is fed with a cipher pulse sequence from a cipher pulse generator 4. The enciphering mixer 2 mixes the clear pulses with the cipher pulses, which is preferably done by means of "modulo-two-addition". The resulting enciphered pulses or enciphered pulse sequence pass to the modulator 3. In the modulator 3 the enciphered pulse sequence is converted into the type of modulation suitable for the transmission, for example amplitude or frequency modulation.

In FIG. 2, these two above-mentioned types of modulation are illustrated as examples. The line a constitutes a part of an enciphered pulse sequence in binary form, as supplied by the enciphering mixer 2. In line b the same enciphered pulse sequence is shown after amplitude modulation and in line c after frequency modulation. In the case of amplitude modulation a binary 1 corresponds to an alternating current voltage having a frequency f and an amplitude u and a binary 0 to the voltage 0. In the case of frequency modulation an alternating current voltage of constant amplitude u is continuously transmitted, but the frequency is changed. For example a frequency $f_o$ represents a binary 0 and the frequency $f_1$ a binary 1.

The transmitted signal (enciphered pulse sequence) passes at the reception end to a demodulator 6, which passes the demodulated enciphered pulse sequence to a deciphering mixer 7 in the form of direct current binary pulses. At the same time the deciphering mixer 7 is fed with the same cipher pulse sequence as the enciphering mixer 2 on the transmission side, this sequence being produced by the reception side cipher pulse generator 9. In the deciphering mixer 7 the decoding of the enciphered pulse sequence received is effected and the clear pulse sequence recovered in this manner is fed to the clear pulse-clear signal converter 8, which converts it back into the original information form.

The installation works in synchronous operation, that is to say the cipher pulse sequence of the transmission side and reception side cipher pulse generators is controlled respectively by clocks 5 and 10. The clock 5 on the transmission side normally runs with constant timing frequency, while the clock 10 on the reception side can be controlled by the associated synchronizing unit SY in accordance with the commencement of cipher pulse synchronism and the maintenance of the latter. For this purpose on the correlation synchronization of the synchronizing unit SY the transmitted transmission side cipher pulse sequence is fed through the line 117 and the self-produced reception side cipher pulse sequence is fed through the line 113, which with these two criteria independently establishes the cipher pulse synchronism. This is fully described more below with reference to FIG. 18.

The cipher pulses from the transmission side cipher pulse generator 4 and the clear pulses of the clear signal-clear pulse converter 1 must be in phase. The phase position of the cipher pulse is determined by the clock 5. It is therefore necessary for the clear pulses to be fed into the enciphering mixer 2 with the same phase position. In the installation shown in FIG. 1 this is achieved by ordering the clear pulses of the clear signal-clear pulse converter 1 by means of the clock 5. In cases where this alternative is not possible a so-called buffer synchronous storage means is connected between the clear signal-clear pulse converter 1 and the enciphering mixer 2. This storage means stores the clear pulses or clear pulse combinations coming from the clear signal-clear pulse converter for a short time and, under the control of the clock 5, gives them up to the enciphering mixer 2 in the correct phase position.

Entry into code synchronism is effected in two phases in the case of correlation synchronization.

After completion of the first phase, which is known as step synchronization, the cipher pulse generators on the transmission and reception sides each run on their own clock, while the two cipher pulse sequences may have in relation to one another a maximum displacement of one bit length b, which is known as step phase displacement or also as step phase fault. These conditions will be explained more fully below with reference to FIGS. 3 and 4.

Figure 3:
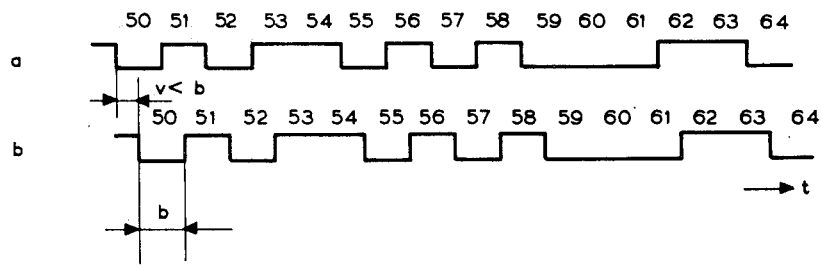
FIGS. 3 to 5 show different reciprocal positions of the cipher pulse sequence on the transmission side (a) and on the reception side (b)
Figure 4:
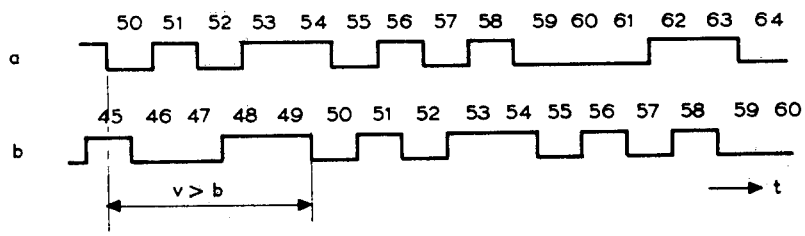

FIG. 3 shows in lines a and b cipher pulse sequences on the transmission and reception sides which have undergone step synchronization. The step phase displacement v between the two cipher pulse sequences is smaller than the bit length b (also known as step length or pulse length). The figures above the individual cipher pulses are intended to indicate after which step of the cipher pulse generator this cipher has been delivered from a predetermined starting condition. FIG. 4 shows two cipher pulse sequences which have not undergone step synchronization.

In order to obtain step synchronization, in the correlation synchronization, use is made of the correlation factor between the information content of part of the transmission and reception side cipher pulse sequences. The properties of this correlation factor and its use for controlling the entry into step synchronism are described fully below.

Figure 5:
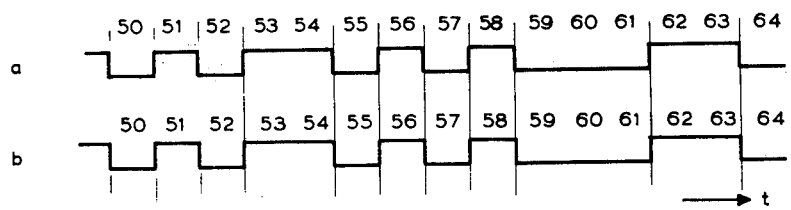

During the second phase, the so-called phase synchronization, the step synchronization is followed by adjustment of the existing step phase error between the transmission and reception side cipher pulse sequences. In the case of two cipher pulse sequences which have undergone step phase synchronization there is no displacement between the transmission and reception side cipher pulse sequences. The latter case is illustrated in FIG. 5.

For the purpose of obtaining step phase synchronization, in the correlation synchronization use is made of the correlation function value between the time functions of part of the transmission and reception side cipher pulse sequences, to which more detailed reference will be made hereinbelow.

Through the inaccuracies of the clocks, even if these are small, the transmission and reception side cipher pulse sequences will in the course of time become displaced again. This phase displacement is also adjusted by the step phase synchronization.

During the transmission of information, the transmission side cipher pulse sequence is not available on the reception side and thus any step phase error which may occur can not be adjusted during the transmission of information. Since however on the transmission and reception side use is made of very accurate clocks, for example quartz controlled clocks, it is immediately possible to transmit information during a certain time without step phase synchronization. During the natural pause in the transmission of information, and if necessary during an artificially produced pause, only the transmission side cipher pulse sequence is transmitted once again and the receiver station will have time to correct the step phase error which has occurred in the meantime.

Reference will now be made to the correlation properties of random sequences or pseudo-random sequences, which term includes the cipher pulse sequences of cipher pulse generators such as are used for correlation synchronization.

The correlation factor r of two identical random sequences coinciding in respect of time is one, but this factor tends to move towards zero in the case of non-identical sequences or sequences which do not coincide in respect of time. The same applies to so-called pseudo-random sequences. By this is meant sequences having a similar statistical distribution to that of actual random sequences, but produced mechanically in a predetermined manner.

From a strictly mathematical point of view the correlation factor is formed by the following formula:

$$r = \frac{n \xrightarrow{\lim} \frac{1}{\infty \, n} \sum_{i=1}^{n} v_i \cdot w_i}{\sqrt{\overline{v_i^2} \cdot \overline{w_i^2}}}$$

Herein $v = x - \bar{x}$ and $w = y - \bar{y}$, $\bar{x}$ and $\bar{y}$ being the arithmetic means of the sequences x and y and v and w being the arithmetic means of the sequences v and w. In the case of electric signals $\bar{x}$ and $\bar{y}$ are the direct current component.

Technical importance is however possessed only by the short time correlation, in which the interval during which the mean value is formed has a finite magnitude. The formula for the correlation factor thus changes over to the following form:

$$r = \frac{\frac{1}{n} \sum_{i=1}^{n} v_i \cdot w_i}{\sqrt{\overline{v_i^2} \, \overline{w_i^2}}}$$

In the case of the application of the correlation principle the values are in binary form. They can thus assume only two conditions, the binary zero = 0 and the binary one = 1. If we assign to the two conditions "0" and "1" the values −1 and +1, the two value sequences, assuming a random character, have no direct current fraction ($\bar{x}$ and $\bar{y} = 0$) and the actual value ($\sqrt{\bar{v}^2 \, \bar{w}^2}$) is equal to one. In this case the above formula is reduced to the following form:

$$r = \frac{1}{n} \sum_{i=1}^{n} x_i \cdot y_i \qquad (1)$$

Figure 6:
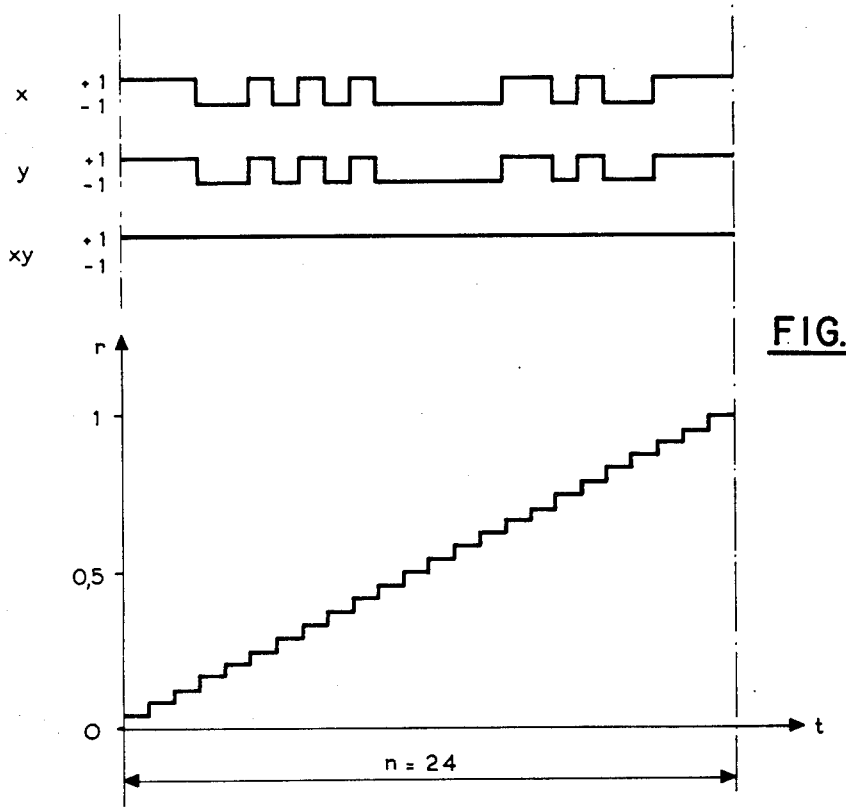
FIGS. 6 to 8 show graphs illustrating the principle of correlation.
Figure 7:
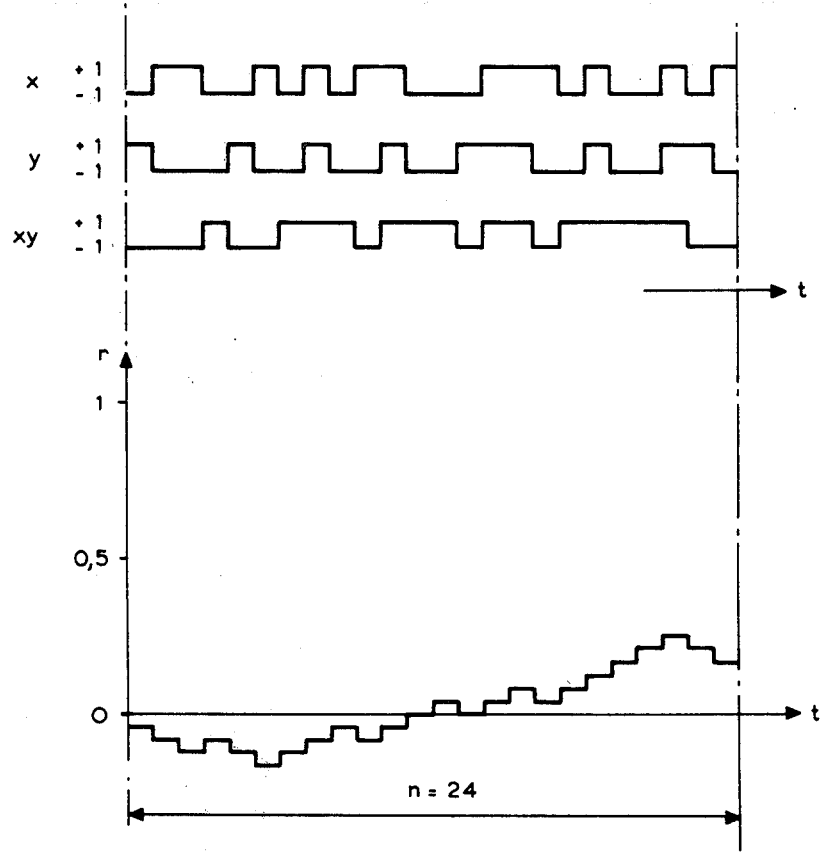

As explained above, the correlation factor of two identical sequences is one. This case is illustrated in FIG. 6. In the case of two non-correlated sequences the correlation factor r tends towards zero, as illustrated in FIG. 7.

If the value sequences x and y exist as time functions, the formula (1) changes over the integral form:

$$r = \frac{1}{T} \int_0^T x(t) \, y(t) \, dt$$

this special formula applying once again only to binary signals having a random character and for the two conditions assigned the values +1 and −1.

If y (t) is retarded with a variable, we obtain the correlation function $\psi(\tau)$:

$$\psi(\tau) = \frac{1}{T} \int_0^T x(t) \, y(t - \tau) \, dt \qquad (2)$$

Figure 8:
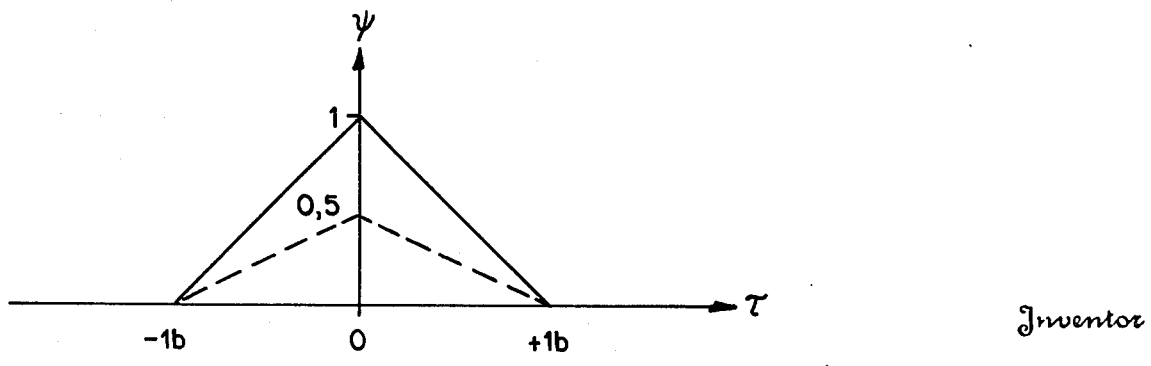

With identical time functions therefore x = y, we therefore obtain the self-correlation function $\psi(\tau)$ according to FIG. 8, which with a displacement of zero ($\tau = 0$) has a maximum value and is symmetrical.

The above described properties of the correlation factor of two value sequences (formula 1) and of the correlation function (formula 2) are applied in the case of correlation synchronization for effecting step and step-phase synchronization.

In the case of synchronous transmission, the cipher pulse generators are advanced in each case by the respective clock on the transmission and reception sides with practically the same timing frequency. The period of this timing frequency corresponds to the length of the clear pulse. At the beginning of the making of contact, it is thus required to bring these two cipher pulse generators into step synchronism.

The obtaining of step synchronism is fundamentally possible in two ways. In both alternatives the transmission and reception side cipher pulse generators are first brought into the same initial condition. Starting from this initial condition, in the first alternative the clocks are simultaneously switched on in both cipher pulse generators, and cipher pulse generators working in step synchronism are obviously obtained. In the second alternative, the clocks must not be switched on simultaneously but in a previously determined sequence. For example, the receiver clock is switched on before the transmitter clock. By suitable choice of the running speed of the reception side cipher pulse sequence, the effect can also be achieved that both cipher pulse generators are in the same position at a later moment. The cipher pulse sequences cross one another as they proceed. In the example assumed above the receiver cycle would have to be slower than that of the transmitter. On the reception side means establish when this crossing takes place and at this moment the receiver timing frequency is abruptly changed over to that of the transmitter. From this moment onwards the two cipher pulse generators are in step synchronism. The timing for the conditions assumed above is illustrated in the diagram in FIG. 9a. In this diagram the course of the cipher pulse sequences is plotted on the ordinate axis S against the time axis t. The line SE symbolizes the course of the receiver cipher pulse sequence and the broken line SS that of the transmitter cipher pulse sequence. The receiver clock and thus the receiver cipher pulse sequence S begins to run at the moment of time $t_1$. The transmitter clock and thus the transmitter cipher pulse sequence SS begins to run at the moment of time $t_2$. As illustrated, the receiver clock first runs more slowly than the transmitter clock. The two lines SS and SE cross at the moment of time $t_4$. At this moment the frequency of the receiver clock is abruptly brought into coincidence with the frequency of the transmitter clock.

Figure 9A:
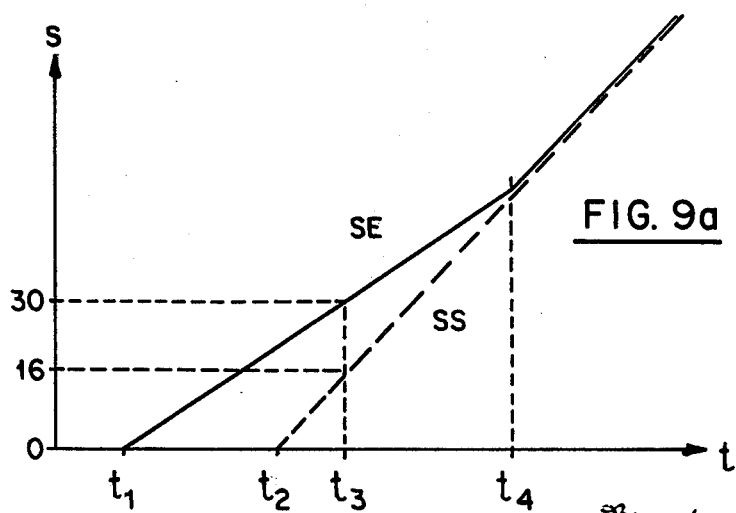

The correlation before the step synchronism, as illustrated in FIG. 9a, is said to advance on the reception side. In this case the reception side cipher pulse generator, counting from an initial condition which is the same for both cipher pulse generators, is situated at a higher step number than the transmission side cipher pulse generator before the crossing point of time $t_4$ is reached. In FIG. 9a for example at the moment of time $t_3$ the transmission side cipher pulse generator is in the sixteenth step, while the reception side cipher pulse generator is in the thirtieth step.

The reverse case, that is to say with the reception side lagging is illustrated by FIG. 9b. In this case the reception side cipher pulse generator, counting from an initial condition which is the same for both cipher pulse generators, is situated, before the crossing point $t_4$ is reached, in a lower step number than the transmission side cipher pulse generator. In FIG. 9b for example the transmission side cipher pulse generator is in the forty-second step at the moment of time $t_3$, while the reception side cipher pulse generator is in the twentyseventh step.

In the correlation synchronization the step synchronization is effected in accordance with the second alternative, because by means of the correlation the moment of synchronization can be clearly detected even if the transmission side cipher pulse sequence is disturbed in transmission. This detector works in the manner described below.

Of the transmission and reception side cipher pulse sequences existing in sequence form on the reception side, one interval, the so-called correlation interval $z_o$, consisting of the last n bits, is continuously stored in the transmission or reception interval store, preferably a shift register, and the correlation factor is calculated therefrom by formula (1). The calculation of the correlation factor is effected by comparing (multiplying) together the information of the same bits of the transmission and reception side correlation interval, the so-called pair of values, and forming the correlation factor r by summation of the result of the comparison of all n pairs of values. This factor will oscillate around zero as long as the two intervals are not identical. However, at the moment at which two identical intervals are stored, that is to say the two cipher pulse generators are in the same position, the correlation factor r abruptly jumps towards one. With this criterion, that is to say when the correlation factor r exceeds a predetermined value, the so-called threshold value SW, the clock on the reception side is changed over to the transmission timing frequency. The two cipher pulse generators run with step synchronism from that moment on.

After step synchronism has been established, a step phase displacement of a maximum of ± ½ bit can exist between the two cipher pulse sequences, because the two clocks have not yet been synchronized in this respect. This phase error is adjusted by means of the step phase synchronization, which is described in detail below.

The magnitude of the threshold value SW depends on the degree of disturbance of the transmission at which the step synchronization should still work perfectly. If the maximum permissible error quota for correct entry is q, k = q · n bits are disturbed in the correlation interval, while k can be only a whole number. The correlation factor in this case attains the value:

$$r = \frac{n - 2k}{n}$$

If $(k+1)$ bits are disturbed, entry should not be made. Thus the threshold value SW is determined as follows:

$$\frac{n - 2(k + 1)}{n} < SW < \frac{n - 2k}{n}$$

On the other hand, with a lower threshold value the probability for step entry increases. This so-called faulty entry probability $W_F$ is calculated as:

$$W_F = \frac{\binom{n}{k} + \binom{n}{k-1} + \cdots + \binom{n}{1} + \binom{n}{0}}{2^n}$$

By suitable choice of the correlation interval length n (bit) however any error quotas and faulty entry possibilities are possible. Two numerical examples will show this more accurately, while by the choice of an extremely high error quota it is intended to demonstrate how entry into step synchronism can be made without sensitivity to disturbance.

EXAMPLE 1

Interval length n = 40
Error quota = 20% k = 8

$$W_F = \frac{\binom{40}{8} + \binom{40}{7} + \cdots + \binom{40}{1} + \binom{40}{0}}{2^{40}}$$

$$W_F = 10^{-4}$$

$$\frac{n - 2(k+1)}{n} < SW < \frac{n - 2K}{n}$$

$$\frac{22}{40} < SW < \frac{24}{40}$$

EXAMPLE 2

Interval length n = 60
Error quota = 20% k = 12

$$W_F = \frac{\binom{60}{12} + \binom{60}{11} + \cdots + \binom{60}{1} + \binom{60}{0}}{2^{60}}$$

$$W_F = 1.82 \cdot 10^{-6}$$

$$\frac{n - 2(k+1)}{n} < SW < \frac{n - 2k}{n}$$

$$\frac{34}{60} < SW < \frac{36}{60}$$

From these two examples it can be seen inter alia that by increasing the correlation interval length n from 40 to 60 bits the faulty entry probability is reduced to $1.82 \times 10^{-6}$ despite the same error quota of $10^{-4}$.

The requirements of friend-foe recognition is complied with by using directly the cipher pulse sequence for entry into step synchronism. This entry is possible only to a coacting station which supplies the correct pulse sequence. For this purpose it is necessary that the cipher pulse generators at both stations should start from the same initial condition. The initial condition may for example be obtained by mixing a secret basic key with at least one additional key, as for example described in British patent specification No: 951,174. Another way, in which the additional key need not be transmitted, is the mixing of the secret basic key with the date-time additional key as described in British patent specification No. 1,062,130.

As previously mentioned, after entry into step there may still be a step phase displacement of a maximum of ± ½ bit between the transmission and reception side clocks. In addition, in consequence of the inaccuracy of the clocks, even if this is very small, a step phase displacement may occur in the course of time. These step phase errors of various origins must be corrected. This is effected in both cases by means of the step phase synchronization as explained more fully below.

In the correlation synchronization, for the purpose of step phase synchronization use is made of the properties of the self-correlation function, illustrated in FIG. 8, in the range from -1b to + 1b (b = bit length), which has a maximum in the case of step phase coincidence at $\tau = 0$. If on the reception side the in timing of the cipher pulse sequence produced on the transmission side is correlated with the cipher pulse sequence produced on the receiver side, in accordance with the self-correlation function, a function value is obtained which is dependent on the amount of the step phase displacement. By shifting the phase of the clock on the reception side in such a manner that the function value reaches its maximum, the step phase error between the transmitter and receiver clocks in made zero. In this case the cipher pulses received, which were produced on the transmission side, coincide exactly with those on the reception side.

The advantages of the correlation principle consist in friend-foe recognition and insensitivity to statistically distributed disturbances.

Friend-foe recognition, that is to say failure to react to enemy pulse sequences which aim at slowly drawing the receiving station out of step phase synchronism in order thereby to make the transmission of messages impossible, is effected similarly to step synchronization, through the fact that in order to apply any influence to step-phase synchronization the correct cipher pulse sequence must be available. Since this cipher pulse sequence is secret, unauthorised interference with the step-phase synchronization is reliably eliminated.

Statistically distributed disturbances in the cipher pulse sequence received have the effect that the correlation function value can no longer rise to the value one, since the two correlated pulse sequences are no longer (100%) identical. The disturbances however do not change the character of the self-correlation function, that is to say the maximum of this function always lies at zero step-phase displacement and the fall to −1b and +1b remains linear. By selecting a sufficiently long integration time it is ensured that the statistical fluctuations of the correlation function value produced by disturbances are kept within sufficiently small limits. These fluctuations must be so small that the maximum of the self-correlation function can be determined with the desired accuracy.

In FIG. 8, the self-correlation function is shown in broken lines for a means error quota of 25%.

In the description of a circuit arrangement for step-phase synchronization, reference will again be made to the influence of disturbances, with reference to the Figures.

Figure 12:
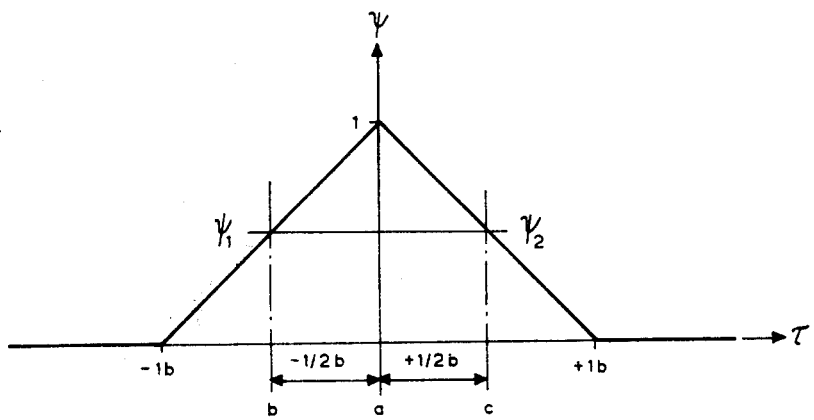
Figure 14:
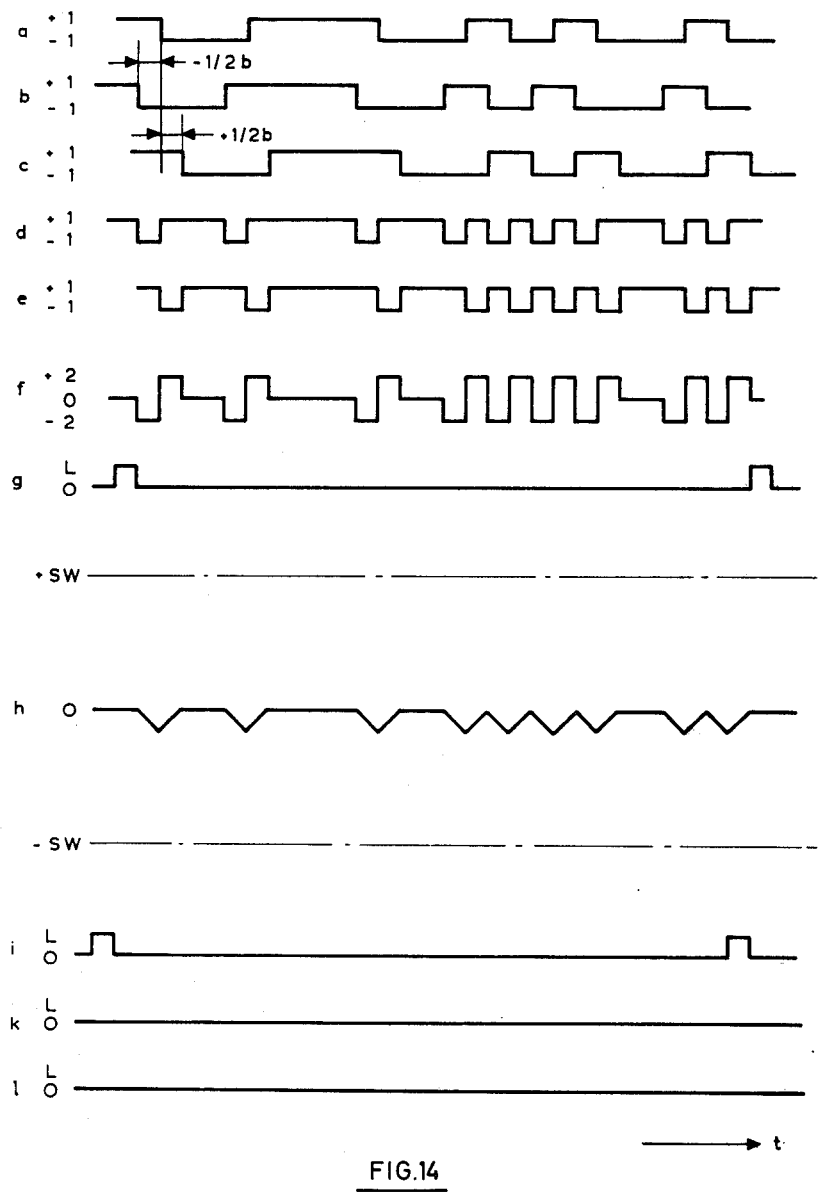
FIGS. 14 to 17 show graphs of four fundamental combinations of signals which may occur in the case of step synchronization effected by the apparatus of FIG. 13.

If the step-phase synchronization is to be effected automatically, as the self-correlation function (except at the zero point) is ambiguous, the sign of the deviation, that is to say the direction of the correction, must be determined. This is possible if for example the cipher pulse sequence received (produced on the transmission side) is correlated with two reception side cipher pulse sequences displaced in relation to one another. These two cipher pulse sequences should lie symmetrically to the cipher pulse sequence used for deciphering, and should preferably have a displacement of + ½ bit and − ½ bit. FIG. 10 shows three such identical reception side cipher pulse sequences, the cipher pulse sequence of 9a being used for deciphering and the other two pulse sequences o and c being required for step phase synchronization. The last-mentioned have a phase displacement of − ½ bit and + ½ bit respectively in relation to the pulse sequence of line a. As previously mentioned, the reception side cipher pulse sequences b and c of FIG. 10 are correlated with the received cipher pulse sequence produced on the transmission side, and the difference is formed from the resulting correlation function values, which in FIGS. 11 and 12 are designated by $\psi_1$ and $\psi_2$. As is shown with the aid of the following examples, this differences has a suitable criterion for the automatic control of step phase synchronization.

If the reception side cipher pulse sequence used for deciphering (line a in FIG. 10) is in phase with the received cipher pulse sequence produced on the transmission side, the two correlation function values $\psi_1$ and $\psi_2$ are equally great and thus the difference is equal to zero. These conditions are plotted in FIG. 12, where the abscissae a, b, and c designate the phase positions of the three reception side cipher pulse sequences.

In FIG. 11 the conditions for a lagging receiver clock that is to say positive step phase displacement, are illustrated. As can be read from this Figure, the correlation function value $\psi_1$ is greater than the correlation function value $\psi_2$, and thus the difference is positive.

With an advancing receiver clock, that is to say negative step phase displacement, as can immediately be seen, conditions are reversed and thus the difference is negative.

The criteria for controlling the pulse synchronization can be summed up as follows:

(1) Pulse synchronism: (phase displacement zero) $\psi_1 - \psi_2 = 0$.

(2) Receiver clock lagging (positive step phase displacement): $\psi_1 - \psi_2 > 0$.

(3) Receiver clock advancing (negative step phase displacement): $\psi_1 - \psi_2 < 0$.

Two values $\psi_1$ and $\psi_2$ are well known to be integrals (see formula 2). Since the difference between two integrals is equal to the integral of the differences, the formation of the difference may also be effected before the integration. If in addition a fixed integration time is introduced, the integral can be regarded direct as a standardised mean value. Taking these two considerations into account, the circuit arrangement illustrated in FIG. 13 for pulse synchronisation is obtained, which is also used in the block diagram in FIG. 18 and is described below.

Figure 15:
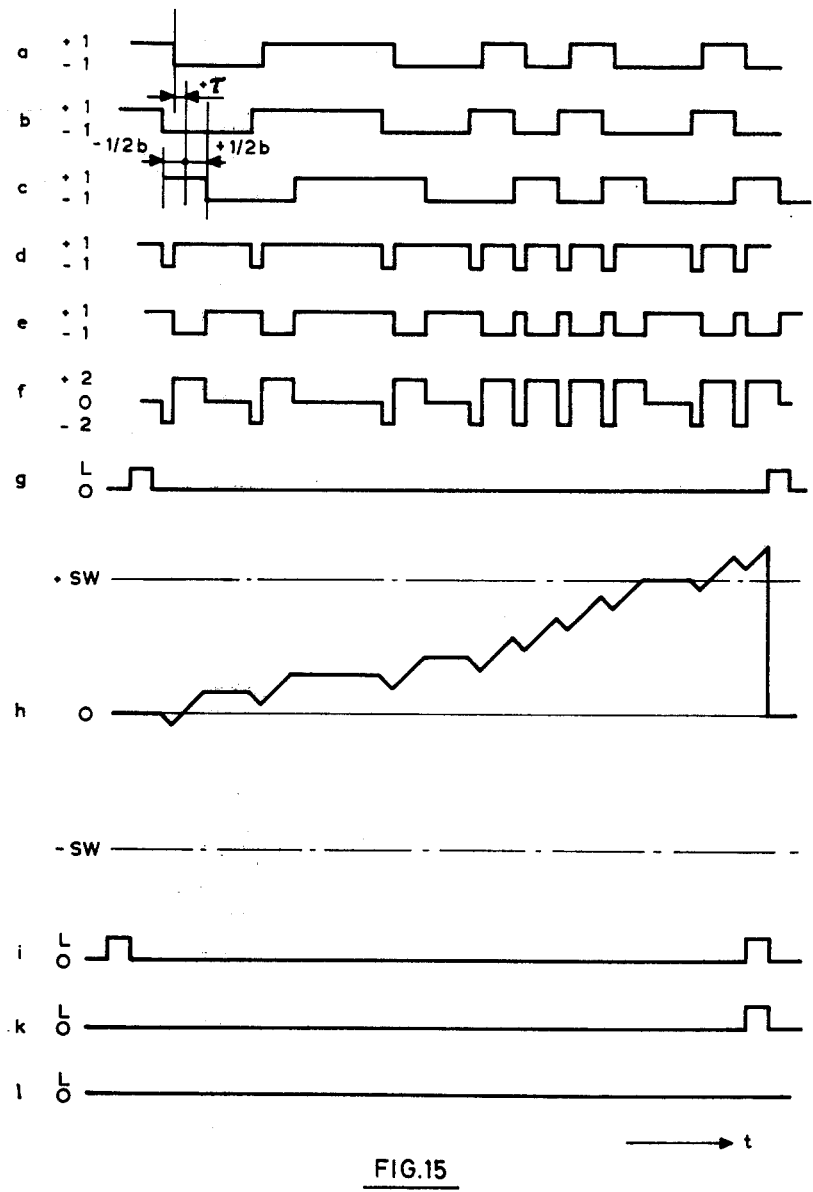
Figure 16:
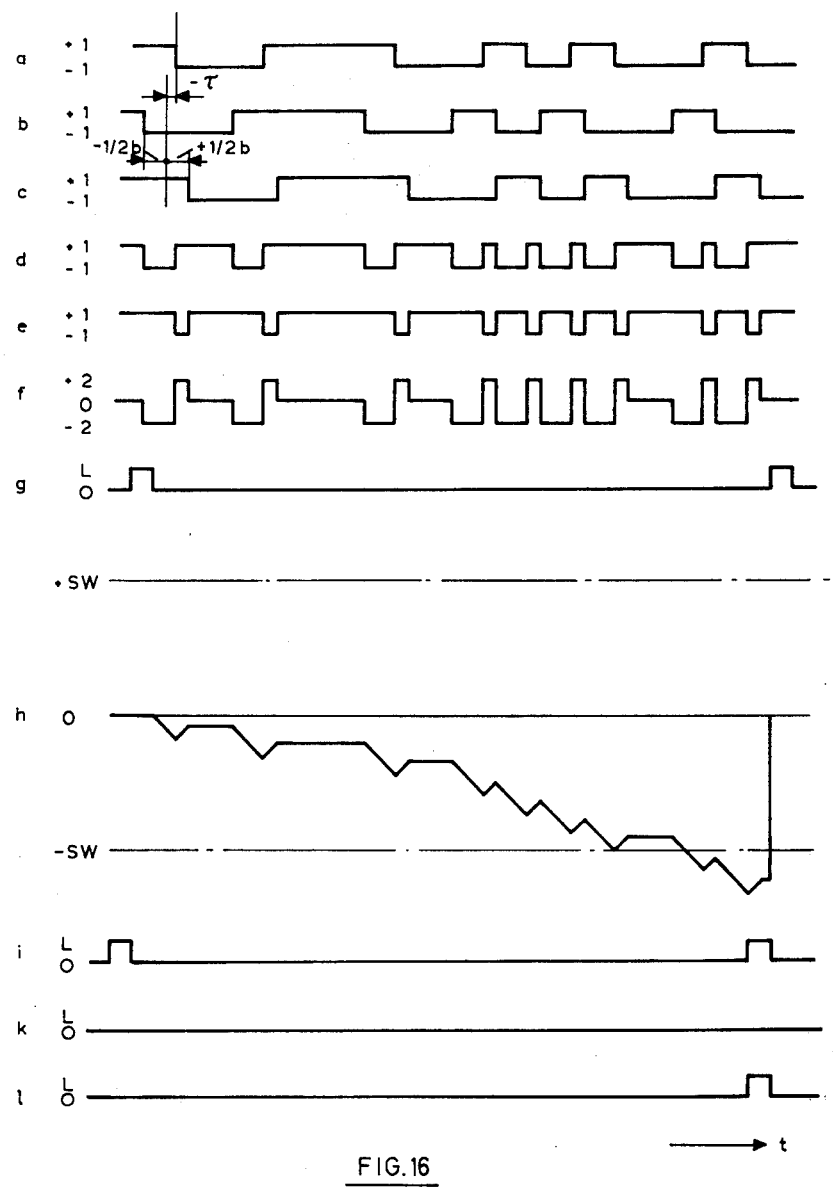
Figure 17:
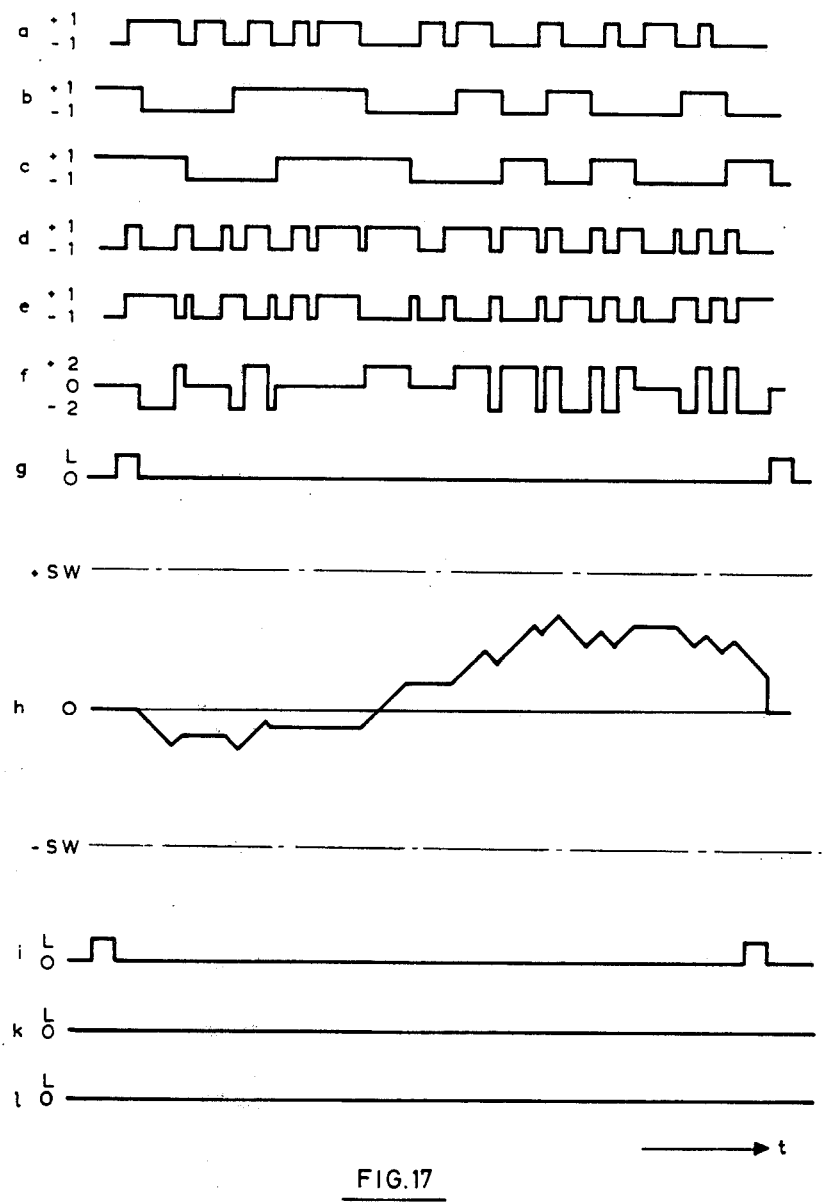

In accordance with the embodiment of the invention illustrated in FIG. 13, in the form of a circuit arrangement for performing the step phase synchronisation, two correlation multipliers 806 and 807 are fed on the one hand through the line 805 with the same transmission side cipher sequence, and on the other hand through the lines 113 and 804 with reception side cipher pulse sequences. The two reception side cipher pulse sequences have in the pulse-synchronised state a phase displacement of − ½ bit and + ½ bit in respect of the transmission side cipher pulse sequence arriving on the line 805. This state is illustrated in the diagram in FIG. 14, where the lines a, b, c, illustrate the cipher pulse sequences on the lines 805, 113, 804. FIGS. 15 to 17 show three further combinations. In FIGS. 14 to 17 the two binary conditions of the pulse sequences of lines a, e are again designated by + 1 and − 1, corresponding to the valuation convenient for correlation.

The correlation multipliers 806, 807 perform the multiplication of the two cipher pulse sequences fed in. The resulting product sequences are in each case illustrated in lines d and e FIGS. 14 to 17. These product sequences pass through the line 820 and 821 respectively through the differential amplifier 808, where a new sequence is formed corresponding to the difference between the two product sequences. This new pulse sequence is in each case illustrated in line f in FIGS. 14 to 17. The new pulse sequence, which is best referred to as a differential sequence, is integrated in the integrator 809. The value of the integral corresponds with a defined constant integration time, to the difference of the correlation function values between the transmission side cipher pulse sequence and the respective reception side cipher pulse sequences, and is thus a measure of the step phase error of the two clocks participating in the connection. This error signal if illustrated in each case in line h in FIGS. 14 to 17. The error signal h passes through the line 822 to the threshold value detector 812, where a comparison is made with a predetermined threshold value SW, which is fed through the threshold detector by an adjustable threshold generator 811. The threshold detector 812 switches the two outputs 813 and 814 in accordance with the following control criteria:

| Step phase displacement | error signal h | conditions of lines | |
|---|---|---|---|
| | | 813 | 814 |
| Positive | h ≧ SW | 1 | 0 |
| 0 | SW > h > −SW | 0 | 0 |
| Negative | h ≦ −SW | 0 | 1 |

The magnitude of the threshold value SW is determined by the requirement that the correlation with any random pulse sequence received must not result in any correction of the step phase position of the reception side clock. In this case the error signal h fluctuates about the value zero, and the threshold value is to be made so great that it is practically never achieved. This case is illustrated in the graphs in FIG. 17 step by step.

With a minimum step phase displacement which should still be corrected, the error signal h must however attain the threshold value SW. Through the integration the error is continuously added, so that through the selection of a correspondingly long integration time, the error signal h can be achieved for minimum step phase errors as small as desired. This is also the case if the transmission side cipher pulse sequence has been disturbed on the transmission path, because the proportion of disturbances in the error signal is on the average zero. The graphs of FIGS. 15 and 16 illustrate the case with a positive and negative step phase displacement respectively.

The integration time is determined by periodically setting the starting condition zero of the integrator 809. This is effected by a pulse on the line 810, which is shown in each case in line g in FIGS. 14 to 17. Shortly before the setting of a new starting condition, the integrator 809 is read, or the decisions of the threshold value detector 812 blanked. By means of a periodic pulse on the line 815 the gates 816 and 817 are opened, so that any correction signal on the line 813 or 814 effects through line 818 and 819 respectively the corresponding correction of the reception side clock by known means. A pulse on the line 818 effects a negative displacement of the phase of the receiver clock, whereas a pulse on the line 819 results in a positive displacement. In FIGS. 14 to 17 the reading pulse of the line 815 is illustrated in each case in line i and the resulting correction pulses on the cables 818 and 819 are shown respectively in the lines k and l. It should be observed that in the above described arrangement illustrated in FIG. 13 the step phase displacement is not determined quantitatively and the correction is made in small, constant steps. The correction of a larger step phase displacement, for example after entry into step, is effected in a plurality of successive measurements and correction steps until the entire step phase displacement has been corrected.

A step phase synchronisation such as has been described with reference to FIG. 13 can adjust a step phase displacement up to ± 1½ bits. This range is larger than is necessary, because after entry into step a step phase displacement of a maximum of ± ½ bit exists and with a step phase displacement of more than 1 bit no further messages can be transmitted.

The step phase synchronisation according to FIG. 13 works only when the transmission side cipher pulse sequence is transmitted. On the other hand it is desired finally to transmit coded messages, that is to say the transmission side cipher pulse sequence is not continuously available on the reception side. Since however for other reasons the clocks must be very accurate (quarts controlled), it is immediately possible to transmit messages for a predetermined time without the step phase synchronisation having to work. During the natural, and if necessary artificially produced transmission pauses, the re-synchronisation of the small step phase displacement occurring during the transmission of messages is in each case effected. At the end of the description reference will moreover be made to an arrangement which permits step phase correction even during the transmission of information.

Figure 18:
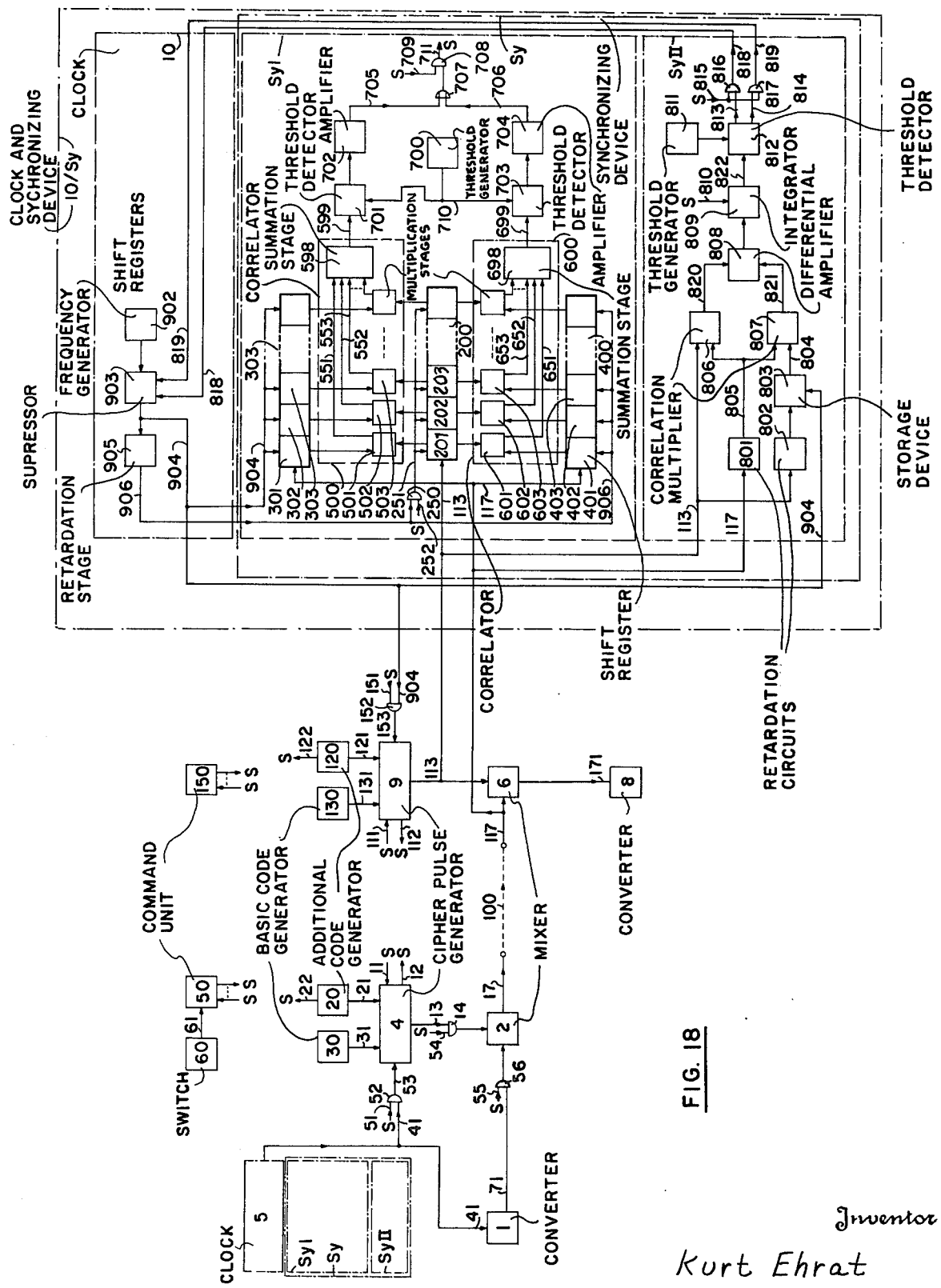
FIG. 18 shows in block diagrammatic form a complete installation for carrying out the method according to the invention.

FIG. 18 shows two stations working together as transmitter and receiver and which are equipped with a synchronising apparatus. In both stations there is a clear information-clear pulse converter 1 and 8 respectively. By means of these converters and clear information is converted into clear pulse sequences (transmitter) or vice versa (receiver). As previously mentioned, the clear pulses have the same phase position as the code pulses. For this purpose in the example described the timing pulses of the transmission side clock 5 are fed to the clear information-clear pulse converter 1, in order that the latter may deliver the clear pulses in the correct phase position. Reference has likewise already been made to the possibility of using a buffer synchronous storage means.

The output 71 of the transmission side converter 1 feeds the clear pulses to an enciphering mixer 2, the output 17 of which is connected to the transmission path which is indicated by the arrow 100 and which for example may be a cable, wire, or radio connection. The transmission path leads on the transmission side into the deciphering mixer 6 which is situated there, and the output 171 of which feeds the converter 8. For the purpose of ciphering, cipher pulse sequences are delivered to the mixers 2 and 6 through the cipher pulse generators 4 and 9, these sequences being mixed in the transmission side mixer 2 with the clear pulse sequences produced by the converter 1. After transmission through the transmission path 100 of the pulse sequences thus enciphered, clear message pulses are produced again by mixing with the identical cipher pulse sequence produced by the cipher pulse generator 9, and these clear pulses control the converter 8. Each of the cipher pulse generators 4 and 9 respectively is controllable through the lines 31, 21 and 131, 121 respectively by respective basic code generators 30 and 130 respectively and at least one additional code generator 20 and 120 respectively. Through the combined application of these code generators, even in the case of the use of a single basic code, a new initial cipher code position can be produced for each communication established. A so-called random key and/or a date-time key can be used as additional key, as described in detail in the previously mentioned British patent specifications No. 951,174 and No. 1,062,130.

In addition, each station is equipped with a clock 5 and 10 respectively. Each of these clocks has a frequency generator (902), the frequencies of all these generators coinciding as accurately as possible. At least the clock of the reception station is in addition equipped with a pulse pick-up suppressor stage 903 and a retardation stage 905.

A synchronising device Sy is provided at least in the reception station. As a rule, each station is equipped so that it can be optionally used both as a transmitter and as a receiver. All stations are then of identical construction, while naturally each station also has an identical synchronising device and an identical clock.

As illustrated, the synchronising device Sy consists of two parts SyI and SyII. The part SyI serves for controlling entry into step, that is to say for step synchronisation. The part SyII serves for step phase correction or for maintenance of synchronism, that is to say for step phase synchronisation.

The part SyI of the synchronising device comprises three shift registers 200, 300, and 400 (transmission and reception interval stores), two correlators 500 and 600, two threshold value detectors 701 and 703, one threshold value generator 700, and two amplifier stages 702 and 704. In accordance with the arrangement illustrated in FIG. 13 and described in detail above, the part SyII consists of two correlation multipliers 806 and 807, a differential amplifier 808, an integrator 809, a threshold value detector 812, and a threshold value generator 811. In order to have the necessary cipher pulse sequences ready in the desired phase position, this arrangement is preceded by two retardation circuits 801 and 802 and by a storage stage 803.

Each of the stations is equipped with a command unit 50 and 150 respectively, which controls the operation of the various individual phases. In order not to confuse the block diagram, the control lines between the command unit and the individual parts of the apparatus are not inserted in the drawing, but are marked S, the arrow associated with each unit gives in each case the direction of the signal flow, to or from the command unit.

Details and the mode of operation of the apparatus illustrated in FIG. 18 are described fully below. For the purpose of setting the initial condition of the cipher pulse generators, use is here made of the method described in the previously mentioned British patent specification No. 1,062,130, in which a date-time key is used as additional key.

In obtaining the initial condition of the cipher pulse generators 4 and 9 by the "date-time key" method, a new additional key is produced according to the date and time at regular intervals, for example every minute. In the present embodiment the additional key generators 20 and 120 are therefore each equipped with a clock.

On the transmission side the date-time key is transmitted through the line 21 to the cipher pulse generator 10. On each change of the date-time key, the additional key generator 20 signals this change to the command unit 50 through the line 22. As long as the apparatus is in the position of rest, the command unit 50 ensures through the line 11 that the new initial condition in the cipher pulse generator 4 is set, that is to say the mixing of the date-time key on the line 21 with the secret basic key, which is transmitted through the line 31 from the basic key generator 30.

In order that the cipher pulse sequence which is transmitted at a later moment will give practically no hints as to the secret basic key, the cipher pulse generator 4 is advanced by a predetermined number of steps, the so-called distance steps, after the setting operation. This is achieved through the control unit 50 releasing the timing through the line 51 and the gate 52. The timing pulses originate from the clock 5 and are forwarded through the line 41, the gate 52, and the line 53 to the cipher pulse generator 4. The number of distance steps can be fixed or variable. These steps are counted by the cipher pulse generator 4. The end is signalled through the control line 12 to the command unit 50, which in turn again locks the gate 52 through the line 51 and thus stops the course of the cipher pulse sequence. In a preferred modification with a variable number of distance steps, the number of steps is derived from the secret basic code or date-time code, which changes periodically.

The distance steps must not pass to the transmission path 100. For this reason the control unit 50 closes the gate 14 through the line 54 during the setting operation and the running of the distance steps. Thus no information from which the secret basic cipher code could be obtained relatively easily passes out of the apparatus.

If no transmission takes place, that is to say if the apparatus is still in the condition of rest, this setting operation is repeated on each change of the datetime code. If it is now desired to transmit a ciphered message, the transmission side is changed over from "clear" to "syncrypto". This is done by means of a switch 60, which through the line 61 of the command unit 50 transmits the order to start the synchronisation phase.

Entry is however conditional upon the same initial state being set in the two cipher pulse generators. In consequence of the inaccuracy of the clocks on the transmission and reception side, this condition has not necessarily been complied with during the change of the date-time signal. Therefore an entry order must be blocked or retarded for a short time during the additional key change.

On the assumption that the clocks are adjusted once a day and that their accuracy of running amounts to at least $10^{-5}$, the maximum difference of the clocks is calculated as:

$$\Delta t = \pm 2.24.3600.10^{-5} = 1.73 \text{ sec.}$$

The actual blocking time on the other hand must be slightly longer, in order that an entry initiated shortly before the commencement of the blocking time can still reliably take place and at the end of the blocking time the new correlation interval will already be set on the reception side. As a guiding value, the blocking time for higher timing frequencies can be assumed to be ± 3 sec.

On the entry order initiated by the switch 60, the command unit 50 initiates the step synchronisation phase immediately, or if by accident this coincides with the blocking time, after the termination of the latter. Through the line 51 the gate 52 is opened again, so that the cipher pulse generator is advanced rhythmically with the timing frequency of the clock 5. The cipher pulse generator thus delivers on the line 13 the cipher pulse sequence which contains the correlation interval and afterwards, in the case of modest requirements, may also be used for enciphering. The cipher pulse sequence passes through the gate 14, the mixer 2, and the line 17 to the transmission part 100.

In order that during the entire entry phase, that is to say during the step synchronisation and the subsequent step phase synchronisation, which is dealt with fully below, no clear information may pass into the mixer 2, the gate 56 is blocked during this time by the command unit 50 through the line 55. This time begins with the emission of the cipher pulse sequence and ends on the running-off of a retardation member which is triggered by a second pulse on the control line 12, which pulse signals the emission of the last bit of the correlation interval. The retardation time is selected to be so great that on the reception side the correction of the maximum possible step phase error can be effected (step phase synchronisation)

The connection is now ready for enciphered transmission in snychronous operation. The clear pulse sequence flows through the line 71 and the gate 56 to the enciphering mixer 2. The clear pulse sequence is there mixed with the cipher pulse sequence (enciphered) and the enciphered pulse sequence passes through the line 17 to the transmission line 100.

There is given below a description of the reception side of the block diagram shown in FIG. 18, once again beginning with the setting of the initial condition of the cipher pulse generator. As already explained in detail, in the step synchronisation the beginning and the running speed of the two cipher pulse sequences are so selected that they cross at a later moment of time. As an example the modification illustrated in FIG. 9a with the slower receiver timing was described. In this modification the receiver timing is equal to zero in the limit case, that is to say after the keying-in of the correlation interval $Z_o$ of n bits into the reception interval store, the cipher pulse generator must be stopped again, that is to say the reception side cipher pulse generator is temporarily brought to rest. For this special case the block diagram shown in FIG. 18 is designed.

Controlled by the clock of the additional key generator 120 and the command unit 150, the analogous setting operation of the initial condition of the cipher pulse generator 9 takes place simultaneously, as well as the execution of the distance steps, as on the transmission side. In contrast to the transmission side this running operation is not interrupted after the last distance step, but the correlation interval is thereupon produced. The control of this operation is effected by the fact that after the first pulse on the line 112, that is to say after the last distance step the command unit 150 does not interrupt the running, but permits continuation to the second pulse on this line. The steps between the last distance step and the last bit of the correlation interval are thus also counted by the cipher pulse generator 9 and may again be fixed or variable, for example derived from the secret basic key and date-time key or any device which permits a random number. The only condition is that at least n steps (length of the correlation interval $Z_o$) must be made.

During the entire running operation described above the resulting cipher pulse sequence is passed through the line 113 to the first stage 201 of the shift register 200 (reception interval store). Through the line 252 the command unit 150 frees the gate 250, likewise during the entire running operation, so that the timing pulses can be passed on the line 906 through the gate 250 and the line 251 to all stages of the shift register 200 and the entire cipher pulse sequence is keyed into the shift register 200 by that moment. Since however the shift register 200 is required to have only a storage capacity of n bits, finally only the last n bits, that is to say the correlation interval $Z_o$ of the cipher pulse sequence, are stored.

It should further be added that the timing pulses on the line 906 have a retardation of 0.5 bit in relation to the timing pulses on the line 904. The individual cipher pulses are thus always keyed into the shift register 200 in the middle between two steps of the code generator 110. The retardation is produced by the stage 905 of the clock 10.

As long as there has been no entry into step synchronism, the production and storage of the correlation interval $Z_o$ is repeated for every change of the date-time key, so that on the transmission and reception sides the cipher pulse generators always start from the same initial condition for the purpose of producing the correlation interval.

In addition to the periodic production of the correlation interval, the correlation factor between the last n bits received and the correlation interval produced on the reception side and stored in the shift register 200 is continuously formed. For the received pulse sequence a store (transmission interval store) is thus necessary, for which purpose in our example a shift register is likewise used. The shift pulses must have the same timing frequency as the clock 5 on the transmission side, by which the transmission side cipher pulse sequence is produced. Since however before entry into step synchronism the clocks may have any phase relationship, it is possible that the shift pulses may coincide with the end of the bit or the beginning of the bit of the pulses received and therefore keying into the first stage of the shift register is not plainly determined. For this reason, in the present embodiment use is made of two shift registers (transmission interval stores), the shift pulses of which are reciprocally upset by half a bit period, so that at least one shift register correctly stores the pulse sequence received. These are the shift registers 300 and 400, the shift pulses of which on the lines 904 and 906 are displaced in relation to one another by one half bit period by the retardation stage 905. The pulses arriving from the transmission line 100 pass through the line 117 to the stages 301 and 401 of the shift registers 300 and 400 where, as has already been stated above, the last n bits received are always stored.

Figure 19:
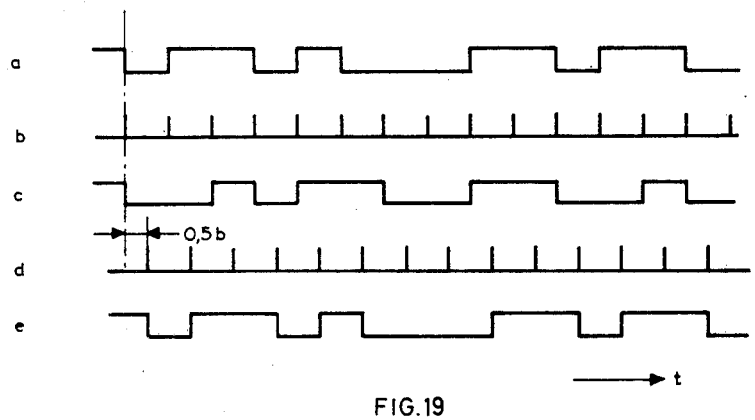
FIG. 19 shows a graph illustrating the operation of the step synchronization device designated SyI in FIG. 18.

In FIG. 19 the conditions existing for the above-mentioned special case are shown. The line a represents any cipher pulse sequence received through the line 117. In line b the shift pulses arriving through the line 904 are shown, which by accident (as illustrated) coincide with the end or beginning of the bit of the cipher pulse sequence received. The line c shows the partly wrongly stored pulse sequence in the shift register stage 301. For the shift register 400 the conditions in the lines d and e are shown, from which it can be seen that in the shift register stage 401 the pulse sequence received are correctly stored.

Since the cipher pulse sequence received must be stored twice, two correlators are also required. These are the correlators 500 and 600, which form the correlation factor between the cipher pulse sequences stored in the shift registers 200, 300 and 200, 400 respectively.

Each correlator consists of n multiplication stages corresponding to the two cipher pulse sequences, each of which consists of n bits, and of a stage for forming a mean value (summation). In the correlator 500 these are the multiplication stages 501, 502, 503, ..., which are fed by the appertaining shift register stages 201 and 301, 202 and 302. The products of the n multipliers are fed through the lines 551, 552, 553, ..., for the purpose of forming the mean value, to the stage 598, which at its output on the line 599 supplies the correlation factor $r_1$.

The correlator 600 is of exactly the same construction, its output supplying the correlation factor $r_2$ to the line 699.

As long as the pulse sequence received is any random sequence or an interval of the cipher pulse sequence before the reception side correlation interval $Z_o$ is stored in the reception interval store 200, the two correlation factors, as shown further above oscillate around zero. If however the n bits of the correlation interval $Z_o$ were received by the transmission side cipher pulse sequence and thus correctly stored in at least one of the two shift registers 300 and 400, the correlation factor of at least one of the two correlators $r_1$, $r_2$ abruptly jumps towards one. The rising of the correlation factor above a given threshold value SW, which is determined by the maximum permissible error quota, is detected, as has likewise been previously stated as the crossing point of the running of the transmission and reception side cipher pulse sequences, (see FIG. 9a) and used as a signal for re-switching on the cipher pulse generator 9. This detection is effected for one correlator in each of the threshold value detectors 701 and 703, which are fed on the one hand with the predetermined threshold value from the threshold value generator 700 and on the other hand with the correlation factor of the two correlators 500 and 600. The threshold value detectors deliver a pulse at their outputs as soon as the correlation factor exceeds the threshold value. This pulse is amplified in the following stage 702 and 704 respectively and passes through the lines 705 and 706 respectively, the gates 707 and 708, and the signal line 711 to the command unit 150, which in turn through the line 151 re-opens the gate 152, so that the cipher pulse generator 9 is advanced with the timing frequency of the clock 900. From this moment onwards the transmission and reception side cipher pulse generators 4 and 9 are in step synchronism.

After entry into step synchronism, the gate 708 is blocked by the command unit 150 through the control line 709, so that the step synchronising part Syl can no longer have any effect on the command unit 150.

As has already been mentioned a number of times, after entry into step there may still be a step phase error of a maximum of $\pm\frac{1}{2}$ bit. Because of the inaccuracy of the clocks a step phase error is also produced in the course of time. These two step phase errors of different origins are adjusted by means of the step phase synchronisation.

In the embodiment illustrated in FIG. 18, a similar arrangement SyII is used for step phase synchronisation to that illustrated in FIG. 13. This apparatus has been fully discussed hereinabove. At this point it is merely necessary to describe the preparation of the necessary cipher pulse sequences in the desired phase position and also the transmission of the correction signals.

The two correlation multipliers 806 and 807 must be fed with the transmission side cipher pulse sequence and with the respective reception side cipher pulse sequence. The reception side cipher pulse sequences have in the pulse synchronised condition a phase displacement of $-\frac{1}{2}$ bit and $+\frac{1}{2}$ bit in relation to the transmission side cipher pulse sequence. The correlation of these three pulse sequences is produced by means of the two retardation stages 801 and 802 and also of the storage stage 803.

Through the line 113 the reception side cipher pulse sequence is passed direct to the correlation multiplier 806 and the retardation stage 802. The retardation stage 806 has a retardation time of about $\frac{1}{2}$ bit. This has the consequence that the cipher pulse sequence on the line 113 is keyed into the storage stage 803 with a retardation of 1 bit through the timing pulses on line 904. The storage stage 803 feeds this reception side cipher pulse sequence, retarded by one bit, to the correlation multiplier 807.

In order that finally all the cipher pulse sequences may have the correct phase position, the transmission side cipher pulse sequence, which is supplied through the line 117, must in addition be retarded by one half bit in the retardation stage 801. This retarded pulse sequence passes through the line 805 to the two correlation multipliers 806 and 807.

The obtaining of the correction signals, which are delivered in the form of pulses on the two lines 818 and 819, is fully described hereinabove with reference to FIG. 13. It will here merely be recalled that on the line 818 pulses are periodically delivered as long as the reception side clock has a positive step phase displacement. In the event of a negative step phase displacement, analogous pulses are delivered on the line 819.

These correction signals effect, in the combined reducer-pick-up and suppressor stage 903 of the clock 10, a corresponding correction of the phase position of the timing pulses on the lines 904 and 906.

During the transmission of a message the received enciphered pulse sequence passes through the line 117 into the mixer 160, is there mixed with the cipher pulse sequence of the line 113, and the resulting clear pulse sequence is fed through the line 171 to the converter 8.

Mechanically produced cipher pulse sequences are always periodic. From the cipher point of view however a cipher pulse sequence free from periods is preferable. A period-free cipher pulse sequence of this type can be produced with an installation of the type illustrated in FIG. 18, by causing a period-free date-time key, as described in British patent specification No. 1,062,130 which is produced by the clocks of the additional key generators 20 and 120, to act continuously, on the transmission and reception sides, on the cipher pulse generators 4 and 9.

Figure 20:
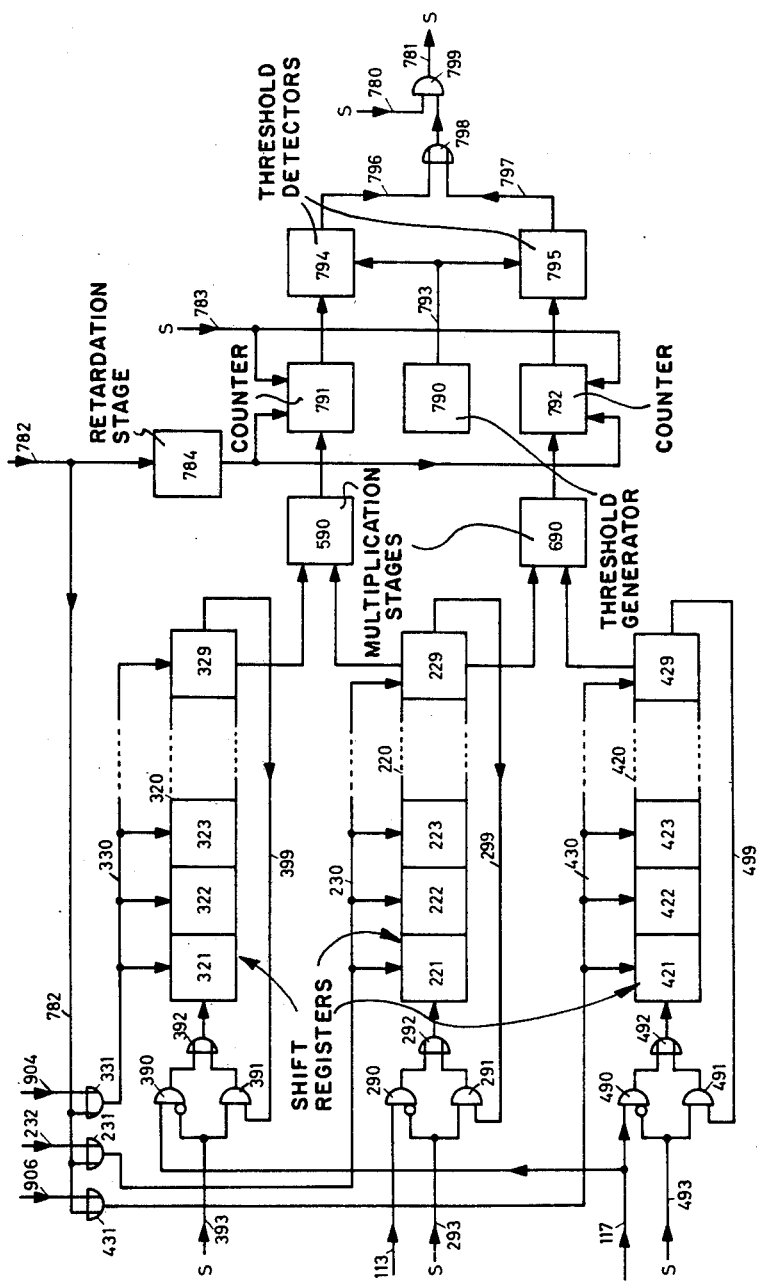
FIG. 20 shows an alternative form of the step synchronization device SyI in FIG. 18.

Another possible way of determining the correlation factor between two pulse sequences is constituted by an arrangement of the type illustrated in FIG. 20, which will now be described. The operation of this apparatus is in principle the same as that of the synchronising part SyI of FIG. 18. In order however to reduce the expense of multipliers, this alternative apparatus operates in sequence. In addition, the summation may be made digitally.

Shift registers are once again used as stores for the n bits of the correlation interval $Z_o$. These are the three shift registers 220, 320, and 420.

The correlation interval produced on the reception side is stored in the shift register 220 on each change of the date-time key, similarly to the use of the synchronising part SyI illustrated in FIG. 18. The cipher pulse sequence passes through the line 113, the AND-gate 290, which was opened by the command unit 150 (FIG. 18) through the line 293, and the OR-gate 292 to the stage 221 of the shift register 220. Through timing pulses having the same frequency as the pulses by which the cipher pulse generator is controlled, but with a phase displacement of + ½ bit, keying is effected into the shift register 220. The shift pulses pass from the line 232 through the OR-Gate 231 and the line 230 simultaneously to all stages of the shift register 220.

The pulse sequence received is keyed into two shift registers with a phase displacement of one half bit for exactly the same reasons as explained with reference to the embodiment illustrated in FIG. 18. For this purpose the pulses received through the line 117 pass on the one hand through the gates 390 and 392 to the shift register stage 321 and on the other hand through the gates 490 and 492 to the shift register stage 421. Through the timing pulses, displaced in phase by ½ bit, on the lines 904 and 906, the pulse sequence received is stored with the same phase displacement in the shift registers 320 and 420. The above-mentioned gates 390 and 490 are opened by the command unit 150 (FIG. 18) through a control line 393 and 493 at the correct moment (shortly before the timing pulse appertaining to the shift register), so that the information in the line 117 can, as described, pass into the shift registers 320 and 420. The same control lines effect through the gates 391 and 491 the separation of the feedback lines 399 and 499 from the shift register inputs, so that the keying-in of the impulses received cannot be disturbed from that side.

Figure 21:
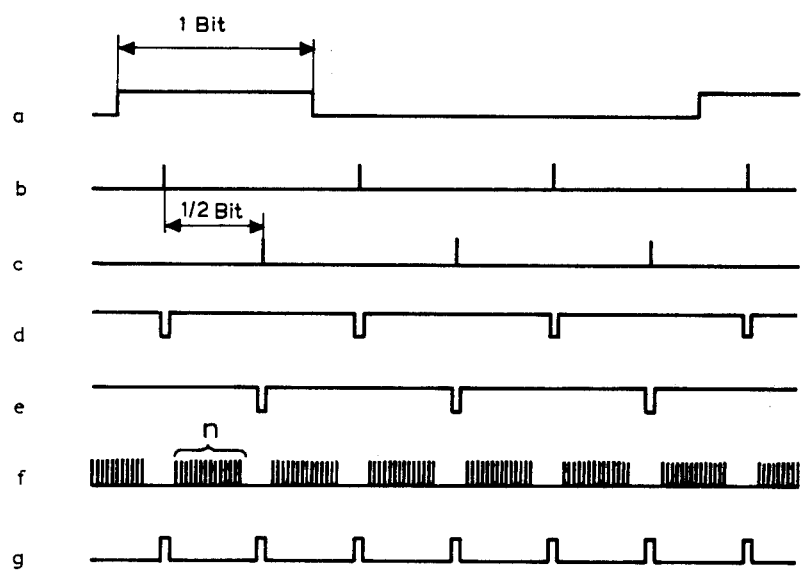
FIG. 21 shows graphs illustrating the operation of the circuit arrangement illustrated in FIG. 20, and FIGS. 22 and 23 show graphs illustrating the application of the method according to the invention to the transmission of messages in clear.

The time conditions can be seen from the graph in FIG. 21. The lines b and c show the timing pulses on the lines 904 and 906 with a phase displacement of ½ bit, but with any phase position in relation to the cipher pulse sequence received, which is illustrated in line a. The lines d and e represent the control pulses on the control lines 393 and 493, which for a short time during the timing pulses connects the line 117 to the shift register inputs.

Thus the last n bits of the pulse sequence received are continuously stored in the two shift registers 320 and 420. As previously mentioned, in the type of embodiment illustrated in FIG. 20, the correlation factor is formed in sequence. Each of the two correlators therefore has only a single multiplication stage 590 and 690 respectively (not n as in the example illustrated in FIG. 18). Each of these two multiplication stages is followed by a counter 791 and 792 respectively. In order to form the correlation factor, all n pairs of bits are connected one after the other to the multiplication stage and in the following counter the number +1 and −1 is counted and the resulting difference formed. In the embodiment illustrated in FIG. 20 this is a counter the direction of counting of which is controlled by the multiplier forwards in the case of +1 and backwards in the case of −1. For each correlated bit a pulse is introduced from outside, this pulse being then counted in the counting device controlled by the multiplier. Because for each pulse of the transmission side code pulse sequence received the correlation factor must be formed twice, there is available for that purpose only a period of time which is shorter than half the bit period of the pulse received.

The sequential connection of all pairs of bits (pairs of values) of the correlation interval to the single multiplier per correlator is effected through the shift registers 220, 320, and 420 being connected together through the feedback lines 299, 399, and 499 to form a ring, and the entire information content stored in the shift register is keyed once around in a circle by n shifts. All the pairs of bits thus come once into the last stage of their shift register (stages 229, 329, and 429), where the correlation multipliers 590 and 690 are connected and together with the counters 791 and 792 form the two correlation factors.

The n shifts are fed from the line 782 through the gates 231, 331, and 431 and also the lines 230, 330, and 430 to the three shift registers. These shifts are illustrated in line f in FIG. 21.

It can also be seen from this Figure that through the control lines 393 and 493 (lines d and e) the shift registers are connected together in a ring during the n shifts. The shift register 220 with the correlation interval produced on the reception side, except in the case of the production of a new correlation interval, is always connected in the ring and the correlation interval is continuously keyed around in a circle, while at the end of a series of shifts on the line 782 the same bits are again stored in the same stages.

Before the commencement of a counting, the counters 791 and 792 are zeroised by a pulse on the control line 783. The phase position of this pulse can be seen from line g in FIG. 21. The following n shifts on the line 782 pass through the retardation stage 784 with a retardation which approximately corresponds to the half period of the pulses on the line 782, into the two counters 791 and 792, where addition or subtraction is effected in accordance with the control of the multipliers 590 and 690 respectively. At the end of the counting the counters deliver the correlation factor of the intervals, stored in the shift registers, in digital form to the threshold value detectors 794 and 795, in which comparison is made with the threshold value fed in from the threshold value generator 790.

The entire operation described above, that is to say the keying of a new received pulse into one of the two shift registers 320 and 420, and also the formation of the new correlation factor in sequence, is repeated until the correlation factor has reached the predetermined threshold value, that is to say until in one of the two shift registers 320 and 420 the transmission side correlation interval is stored. This is the moment for re-switching on the reception side cipher pulse generator, which is effected by an output signal from one of the two threshold value detectors 794 and 795. This output signal passes through the gates 798, 799 and control line 781 to the command unit 150 (FIG. 18), which in turn frees the timing pulses for advancing the reception side cipher pulse generator (command unit and cipher pulse generator are not shown in FIG. 20).

From this moment the cipher pulse generators participating in the connection are in step synchronism.

The relation between the threshold value, error quota, length of the correlation interval, and faulty entry probability is exactly the same as in the embodiment illustrated in FIG. 18 and has been fully explained hereinabove.

If with apparatus illustrated in FIG. 18 it is desired that teleprinter signals, which normally consist of a start pulse, five information pulses, and a stop pulse of one and a half length and normally occur asynchronously, should be enciphered and synchronised by means of correlation synchronisation, they must be converted by suitable means on the one hand into the timing of the clock and on the other hand into a constant pulse length.

As mentioned hereinabove in the description of correlation synchronisation, the step phase synchronisation is normally not possible during the transmission of information, because for this purpose the transmission side cipher pulse sequence must be available on the reception side. This is not the case during the transmission of information. Since however on the reception side the clear information is available after deciphering, it is possible with this clear information and the reception side cipher pulse sequence to produce a reception side enciphered pulse sequence which has the phase position of the receiver clock. By forming the correlation function value between this reception side enciphered pulse sequence and the transmitted transmission side enciphered pulse sequence, which has been delayed by the time required to form the reception side enciphered pulse sequence (so-called process constant), the receiver clock can then be subjected to step phase synchronisation again, even during the transmission of information. In this case however the possibility of so-called friend-foe recognition is lost, that is to say the step phase synchronisation responds to any pulse sequence received, even an enemy pulse sequence, provided that it can follow its timing frequence.

It should be expressly pointed out that the invention is not restricted to enciphered transmission in synchronous operation. It is convenient to operate in synchronous operation even for clear transmission, since in this case disturbed starting pulses transmitted cannot result in any additional disturbance of the information transmitted. As long as the transmission and reception side clocks are in phase synchronism, the clear pulses received are always detected at the correct point under the control of the clock on the reception side, even if accidentally the preceding starting pulse was disturbed. The synchronous operation thus provides advantages even for clear transmission.

The task thus arises of synchronising the two clocks in respect of phase before clear transmission. Step synchronisation is not necessary in this case and thus entry into step synchronism is eliminated. For phase synchronisation, which here is expressly not called step phase synchronisation because the phase synchronism is in this case periodic, a new sequence must be produced by means of the transmission and reception side clocks instead of the cipher pulse sequence and the transmission side sequence must be transmitted to the reception side. With the correlation function value of these two sequences, the reception side clock is subjected to phase synchronisation in a similar manner as for the enciphered transmission already described.

Figure 22:
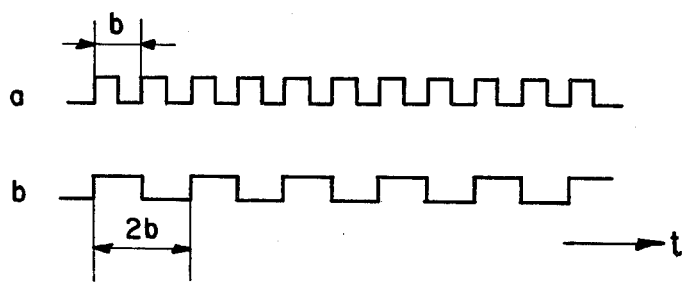

The period of the clocks corresponds to the length of the clear pulses which are to be transmitted after phase synchronisation. If it should be possible for synchronisation to be effected on each timing pulse of the transmission side clock, the pulse sequence which is used for phase synchronisation must have the period of the timing pulses, that is to say the transmission side timing pulses can be transmitted direct. However, for the purpose of transmission these timing pulses require twice the band width as compared with the clear pulses to be transmitted after phase synchronisation, and are normally not used for phase synchronisation. Use is therefore made of a pulse sequence having at least twice the period, as illustrated in FIG. 22. In line a the timing pulses with a period b of a clear pulse are shown, and in line b the pulse sequence with the double period for phase synchronisation.

Figure 23:
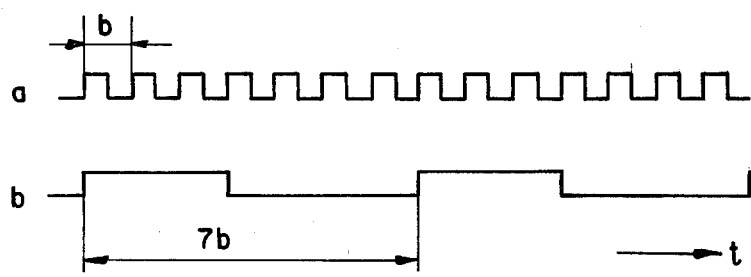

The information is normally transmitted in groups, (pulse combinations), for example groups of seven pulses (bits). If the pulse sequence for phase synchronisation is given the period of the group, the beginning and end of the pulse group can be synchronised simultaneously. FIG. 23 shows once again in line a the timing pulses and in line b the pulse sequence for phase synchronisation with a period of seven clear pulses, by which the phase of the clock and of the group can be synchronised by means of correlation synchronisation.

Exactly as in the case of enciphered transmission, in the case of clear transmission the phase synchronisation may be effective only at the beginning of the transmission and during the transmission pauses. During the transmission itself the very accurate clocks on the transmission and reception sides work without having to be re-synchronised. By the same method as foe enciphered transmission, the phase synchronisation may however also be made effective during the transmission of information.

What is claimed is:

1. A method of ciphering and deciphering binary coded messages represented by coded series of pulses comprising setting a first pulse generator to an initial condition as defined by a secret basic code and then generating under control of a first clock a first binary coded series of cipher pulses, transmitting a part of the first series of cipher pulses to a receiving station, generating at the receiving station under control of a second clock a second binary coded series of cipher pulses having a distribution identical with the first series of cipher pulses, changing at the receiving station the part of the first and a corresponding part of the second series of cipher pulses in their relative positions and forming for each of said positions over an interval of several pulses one correlation factor by multiplying together the values of the momentarily opposite simultaneous pulses of the corresponding parts of the first and second series of cipher pulses and summation of the results of said multiplications, step synchronising with this series of correlation factors a further part of the second series of cipher pulses with a corresponding part of the first series of cipher pulses, taking advantage of the criterion that the step synchronism of the parts of the first and second series of cipher pulses gives an optimal value of the correlation factor, generating at the transmitting station clear message pulses representing a message to be transmitted, mixing the clear message pulses with a step synchronised part of the first series of cipher pulses to form an enciphered pulse train, transmitting the enciphered pulse train to the receiving station and mixing at the receiving station the enciphered pulse train with the corresponding step synchronized part of the second series of cipher pulses taking into account any phase deviation between the corresponding step synchronized parts of the first and second series of cipher pulses to decipher the transmitted message.

2. A method of ciphering and deciphering binary-coded messages according to claim 1, wherein at the receiving station before mixing the enciphered pulse train with the corresponding step synchronized part of the second series of cipher pulses the corresponding step synchronized parts of the first and second series of cipher pulses are phase synchronized.

3. A method of ciphering and deciphering binary-coded messages as claimed in claim 1, wherein the changing of the relative positions of the corresponding parts of the first and the second series of cipher pulses is interrupted, when one of the correlation factors exceeds a predetermined theshold value.

4. A method of ciphering and deciphering binary-coded messages as claimed in claim 1, wherein before step synchronizing the first and second series of cipher pulses the timing frequencies of the first and second clocks are different and the correlation factors are formed periodically with a frequency which is at least as great as the higher of the timing frequencies of the first and second clocks.

5. A method of ciphering and deciphering binary-coded messages as claimed in claim 1, wherein before step synchronizing the first and second series of cipher pulses the second pulse generator is started after the first pulse generator and the timing frequency of the second clock is higher than the timing frequency of the first clock.

6. A method of ciphering and deciphering binary-coded messages as claimed in claim 1, in which the synchronization of the second series of cipher pulses with the first series of cipher pulses is also effected between pauses in the transmission of the enciphered pulse train.

7. A method of ciphering and deciphering binary-coded messages comprising setting a first pulse generator to an initial condition as defined by a secret basic code and then generating a first series of cipher pulses under control of a first clock, transmitting said first series of cipher pulses to a receiving station, generating at the receiving station a second series of cipher pulses having a distribution identical to the first series of cipher pulses under control of a second clock, forming at the receiving station at least one correlation factor over an interval of several pulses between at least one part of the first series of cipher pulses and at least one part of the second series of cipher pulses by multiplying together the values of the momentarily opposite pulses of said first and second series of cipher pulses bit by bit over said interval and summation of the values resulting from the multiplications, changing the first series of cipher pulses whereas the second series of cipher pulses is stopped in previously advanced position, forming in the same manner previously advanced position, forming in the same manner further correlation factors and step synchronising with the resulting series of correlation factors the generation of the second series of cipher pulses in accordance with the first series of cipher pulses such that when one of said correlation factors exceeds a predetermined threshold value the second pulse generator is restarted at the same timing frequency as the timing frequency of the first pulse generator, phase synchonizing the step synchronized first and second series of cipher pulses, generating at the transmitting station binary-coded clear message pulses representing a message to be transmitted, mixing the clear message pulses with the first series of cipher pulses to form an enciphered pulse train, transmitting the enciphered pulse train to the receiving station and mixing at the receiving station the enciphered pulse train with the synchronized second series of cipher pulses to decipher the transmitted message.

8. A method of ciphering and deciphering binary-coded messages as claimed in claim 7, wherein the previously advanced position at which the second series of ciper pulses is stopped depends on the second basic code.

9. A method of ciphering and deciphering binary-coded messages as claimed in claim 8 including modifying the secret basic code by a code representing a predetermined date and time.

10. A method of ciphering and deciphering binary coded messages represented by coded series of pulses comprising setting a first pulse generator to an initial condition as defined by a secret basic code and then generating under control of a first clock a first binary coded series of cipher pulses, transmitting a part of the first series of cipher pulses to a receiving station, generating at the receiving station under control of a second clock a second binary coded series of cipher pulses having a distribution identical with the first series of cipher pulses, changing at the receiving station the part of the first and a corresponding part of the second series of cipher pulses in their relative positions and forming for each of said positions over an interval of several pulses one correlation factor by multiplying together the values of the momentarily opposite simultaneous pulses of the corresponding parts of the first and second series of cipher pulses and summation of the results of said multiplications, step synchronising with this series of correlation factors a further part of the second series of cipher pulses with a corresponding part of the first series of cipher pulses, taking advantage of the criterion that the step synchronism of the parts of the first and second series of cipher pulses gives an optimal value of the correlation factor, shifting at the receiving station the step synchronized first and second series of cipher pulses in their relative phases and forming in each phase position one function value of a first correlation function by multiplicative superposition of the step synchronized first and second series of cipher pulses over an interval of several pulses and integration of the result of said superposition over said interval (each of said integral values represents one function value of the correlation function), controlling with the first correlation function the phase synchronization of the second series of cipher pulses with the first series of cipher pulses, taking advantage of the criterion that the correlation function reaches its maximum on phase synchronism of the two correlated series of pulses, generating at the transmitting station clear message pulses representing a message to be transmitted, mixing the clear message pulses with a step and phase synchronized part of the first series of cipher pulses to form an enciphered pulse train, transmitting the enciphered pulse train to the receiving station and mixing at the receiving station the enciphered pulse train with the corresponding step and phase synchronized part of the second series of cipher pulses to decipher the transmitted message.

11. A method of ciphering and deciphering messages as claimed in claim 10, in which the phase synchronization is controlled only when said correlation function exceeds a predetermined threshold value.

12. A method of ciphering and deciphering messages as claimed in claim 10, in which the phase synchronization is controlled by said first correlation function and at least one additional second correlation function, the second correlation function being formed in the same manner as the first correlation function except that the first series of cipher pulses is previously displaced in its phase.

13. A method of ciphering and deciphering messages as claimed in claim 12, in which the first correlation function of the first and second series of cipher pulses is formed after displacement in phase of the second series of cipher pulses.

14. A method of ciphering and deciphering messages as claimed in claim 13, in which the phase displacements of the first and second series of cipher pulses are symmetrical with respect to the initial first and second series of cipher pulses.

15. A method of ciphering and deciphering messages as claimed in claim 14, in which the symmetrical phase displacements are $-178$ bit and $+\frac{1}{2}$ bit.

16. A method of ciphering and deciphering messages as claimed in claim 12 including determining the difference between the first and second correlation functions and controlling with said difference the phase between corresponding parts of the first and second series of cipher pulses.

17. A method of ciphering and deciphering messages as claimed in claim 16, in which the phase between the first and second series of cipher pulses is controlled only when said difference between the first and second correlation functions exceeds a predetermined threshold value.

18. A method of ciphering and deciphering messages as claimed in claim 10, in which the phase synchronization is controlled by said first correlation function and at least one additional second correlation function, the second correlation function being formed in the same manner as the first correlation function except that the second series of cipher pulses is previously displaced in its phase.

19. A method of ciphering and deciphering messages as claimed in claim 18, in which the first correlation function of the first and second series of cipher pulses is formed after displacement in phase of the first series of cipher pulses.

20. A method of ciphering and deciphering binary-coded messages as claimed in claim 19, in which the phase displacements of the first and second series of cipher pulses are symmetrical with respect to the initial first and second series of cipher pulses.

21. A method of ciphering and deciphering binary-coded messages as claimed in claim 20, in which the symmetrical phase displacements are $-\frac{1}{2}$ bit and $+\frac{1}{2}$ bit.

22. A method of ciphering and deciphering binary-coded messages as claimed in claim 18, including determining the difference between the first and second correlation functions and controlling with said difference the phase between corresponding parts of the first and second series of cipher pulses.

23. A method of ciphering and deciphering binary-coded messages as claimed in claim 22, in which the phase between the first and second series of cipher pulses is controlled only when said difference between the first and second correlation functions exceeds a predetermined threshold value.

24. Apparatus for ciphering and deciphering binary coded messages comprising at the transmitting station a first pulse generator settable to an initial condition as defined by a secret basic code to generate under control of a first clock a first binary coded series of cipher pulses, means for generating binary coded clear messages pulses representing a message to be transmitted, a first mixer for mixing the clear message pulses with pulses of the first series of cipher pulses to form an enciphered pulse train, a transmitter for transmitting pulses of the first series of cipher pulses or the enciphered pulse train to a receiving station, said receiving station comprising a second pulse generator for generating under control of a second clock a second binary coded series of cipher pulses having a distribution identical to the first series of cipher pulses, a first store for storing successively in groups pulses of the first series of cipher pulses, a second store for storing successively in groups corresponding pulses of the second series of cipher pulses, means for forming before the beginning of the transmission of an enciphered pulse train a first series of correlation factors varying with the information content of the pulse groups stored in the first and second stores, means for step synchronizing the generation of pulses of the second series of cipher pulses with corresponding pulses of the first series of cipher pulses by said series of correlation factors, means for phase synchronizing the step synchronized first and second series of cipher pulses and a second mixer for mixing pulses of the second series of cipher pulses with the enciphered pulse train to decipher the transmitted message.

25. Apparatus for ciphering and deciphering binary coded messages as claimed in claim 24 including a third store, means for simultaneously storing two identical groups of the first series of cipher pulses with a different phase displacement in said first and said third stores, respectively, means for forming a second series of correlation factors between the information content of the pulses stored in the second store and the information content of the pulses stored in the third store and means for step synchronising the generation of pulses of the second series of cipher pulses with corresponding pulses of the first series of cipher pulses by that one of the first and second series of correlation factor which exceeds a predetermined threshold value.

26. Apparatus for ciphering and deciphering binary coded messages as claimed in claim 25, including means for temporarily stopping the second pulse generator and means for restarting the last-mentioned generator when the correlation factor controlling the last-mentioned generator exceeds said predetermined threshold value.

27. Apparatus for ciphering or deciphering binary coded messages comprising a pulse generator settable to an initial condition as defined by a secret basic code to generate under control of a clock a first series of cipher pulses when the apparatus is used for ciphering messages and when the apparatus is used for deciphering messages to generate a second series of cipher pulses under control of said clock, the second series of pulses having a distribution identical to a first series of cipher pulses received by the apparatus when functioning to decipher the messages, means for generating binary coded clear message pulses representing a message to be transmitted and a mixer for mixing the clear message pulses with pulses of the first series of cipher pulses to form an enciphered pulse train, the apparatus further including a first store for storing successively in groups pulses of the first series of cipher pulses received by the apparatus when functioning to decipher coded messages, a second store for storing successively in groups pulses of the second series of cipher pulses corresponding to the pulses of the first series stored in the first store, means for forming a first series of correlation factors varying with the information content of the pulse groups stored in the first and second stores, means for step synchronizing with said series of correlation factors the generation of pulses of the second series of cipher pulses with corresponding pulses of the first series of cipher pulses by said apparatus, means for phase synchronizing the step synchronized first and second series of cipher pulses, the mixer being arranged to mix the synchronized pulses of the second series with the received enciphered pulse train to decipher the message received by said apparatus.

* * * * *